US010509592B1

(12) United States Patent
Malwankar et al.

(10) Patent No.: US 10,509,592 B1
(45) Date of Patent: Dec. 17, 2019

(54) PARALLEL DATA TRANSFER FOR SOLID STATE DRIVES USING QUEUE PAIR SUBSETS

(71) Applicant: Pavilion Data Systems, Inc., San Jose, CA (US)

(72) Inventors: Kiron Balkrishna Malwankar, Sarratoga, CA (US); Karagada Ramarao Kishore, Saratoga, CA (US)

(73) Assignee: Pavilion Data Systems, Inc., San Jose, CA (US)

( * ) Notice: Subject to any disclaimer, the term of this patent is extended or adjusted under 35 U.S.C. 154(b) by 0 days.

(21) Appl. No.: 15/660,735

(22) Filed: Jul. 26, 2017

Related U.S. Application Data

(60) Provisional application No. 62/366,937, filed on Jul. 26, 2016.

(51) Int. Cl.
*G06F 3/06* (2006.01)
*G06F 12/08* (2016.01)

(52) U.S. Cl.
CPC .......... *G06F 3/0659* (2013.01); *G06F 3/0613* (2013.01); *G06F 3/0685* (2013.01); *G06F 12/08* (2013.01); *G06F 3/06* (2013.01)

(58) Field of Classification Search
CPC ....... G06F 9/45558; G06F 2009/45579; G06F 2009/45595; G06F 9/5077; G06F 3/0659; G06F 15/167; G06F 3/067; G06F 3/0688; G06F 13/28; G06F 13/4022; G06F 13/4221; G06F 13/1668; G06F 13/4068
USPC ............. 718/1, 104; 709/212, 213; 370/412; 710/5, 22, 33, 20; 719/314; 711/E12.067
See application file for complete search history.

(56) References Cited

U.S. PATENT DOCUMENTS

| 8,832,324 | B1 | 9/2014 | Hodges et al. | |
|---|---|---|---|---|
| 8,966,172 | B2 * | 2/2015 | Malwankar | G06F 3/0611 |
| | | | | 710/1 |
| 9,285,995 | B2 | 3/2016 | Malwankar | |
| 9,652,182 | B2 | 5/2017 | Malwankar et al. | |
| 9,712,619 | B2 | 7/2017 | Malwankar et al. | |
| 9,880,971 | B2 * | 1/2018 | Lowery | G06F 15/17331 |
| 2004/0240459 | A1 | 12/2004 | Lo et al. | |
| 2004/0252709 | A1 * | 12/2004 | Fineberg | G06F 9/546 |
| | | | | 370/412 |
| 2006/0136677 | A1 | 6/2006 | Fuhs et al. | |
| 2006/0155880 | A1 | 7/2006 | Elnozahy et al. | |
| 2006/0236063 | A1 | 10/2006 | Hausauer et al. | |
| 2009/0083476 | A1 * | 3/2009 | Pua | G06F 3/0613 |
| | | | | 711/103 |

(Continued)

*Primary Examiner* — Faisal M Zaman
(74) *Attorney, Agent, or Firm* — Lowenstein Sandler LLP

(57) ABSTRACT

A first I/O controller of a storage server sends a first command to a first solid state drive (SSD) of the storage server via a first submission queue of the first SSD, wherein the first command is a first read command or a first write command. The first I/O controller receives a first acknowledgement from the first SSD that the first command has been completed via a first completion queue of the first SSD. A second I/O controller of the storage server sends a second command to the first SSD of the storage server via a second submission queue of the first SSD, wherein the second command is a second read command or a second write command. The second I/O controller receives a second acknowledgement from the first SSD that the second command has been completed via a second completion queue of the first SSD.

20 Claims, 12 Drawing Sheets

(56) References Cited

U.S. PATENT DOCUMENTS

| | | | |
|---|---|---|---|
| 2009/0106771 A1* | 4/2009 | Benner | G06F 12/1466 |
| | | | 719/313 |
| 2012/0166699 A1* | 6/2012 | Kumar | G06F 13/385 |
| | | | 710/306 |
| 2013/0191590 A1 | 7/2013 | Malwankar | |
| 2013/0198312 A1* | 8/2013 | Tamir | G06F 15/167 |
| | | | 709/212 |
| 2013/0262614 A1 | 10/2013 | Makhervaks et al. | |
| 2013/0266021 A1 | 10/2013 | Basso et al. | |
| 2014/0173338 A1 | 6/2014 | Arroyo et al. | |
| 2015/0026419 A1* | 1/2015 | Stevens | G06F 9/4555 |
| | | | 711/153 |
| 2015/0046625 A1* | 2/2015 | Peddle | G11C 16/10 |
| | | | 710/308 |
| 2015/0178243 A1* | 6/2015 | Lowery | G06F 3/0619 |
| | | | 709/212 |
| 2016/0085718 A1* | 3/2016 | Huang | H04L 29/08 |
| | | | 709/213 |
| 2016/0124847 A1 | 5/2016 | Malwankar | |
| 2016/0147442 A1* | 5/2016 | Baderdinni | G06F 3/061 |
| | | | 711/105 |
| 2016/0162189 A1 | 6/2016 | Malwakar | |
| 2016/0224248 A1* | 8/2016 | Choi | G06F 3/0604 |
| 2016/0259568 A1* | 9/2016 | Grimsrud | G06F 3/0613 |
| 2016/0306549 A1* | 10/2016 | Nadakuditi | G06F 3/061 |
| 2017/0024132 A1* | 1/2017 | Jun | G06F 3/0688 |
| 2017/0123995 A1* | 5/2017 | Freyensee | G06F 12/10 |
| 2017/0124021 A1* | 5/2017 | Brown | G06F 15/17331 |
| 2017/0149897 A1 | 5/2017 | Malwankar et al. | |
| 2017/0168970 A1* | 6/2017 | Sajeepa | G06F 13/385 |
| 2017/0199666 A1 | 7/2017 | Sundaram et al. | |
| 2017/0228173 A9* | 8/2017 | Hussain | G06F 3/0619 |
| 2018/0129616 A1* | 5/2018 | Liang | G06F 3/00 |
| 2018/0285019 A1* | 10/2018 | Olarig | G06F 3/0604 |

\* cited by examiner

US 10,509,592 B1

PARALLEL DATA TRANSFER FOR SOLID STATE DRIVES USING QUEUE PAIR SUBSETS

RELATED APPLICATIONS

This present application claims the benefit of U.S. Provisional Application No. 62/366,937 filed Jul. 26, 2016, which is incorporated herein by reference. The present application is related to co-pending patent application Ser. No. 15/660,712, filed Jul. 26, 2017, entitled "Architecture for Flash Storage Server."

FIELD OF TECHNOLOGY

This disclosure relates generally to the field of data storage and in particular to storage servers that use solid state storage devices.

BACKGROUND

Networked storage arrays may provide an enterprise level solution for secure and reliable data storage. Traditional storage servers include arrays of disk drives that are capable of performing about 100-10/000 input/output operations per second (IOPS). In traditional storage servers, a single processing device performs all physical to logic isolation and manages data accesses to all drives of a storage server. The single processing device is able to manage the IOPS for all of the disk drives without acting as a performance bottleneck.

With the introduction of solid state storage devices (e.g., solid state drives (SSDs) such as Flash drives), the speed of networked storage arrays has improved dramatically because a single SSD is capable of performing about 1 million IOPS. However, a single processing device is not generally capable of handling more than a few million TOPS, and so becomes a bottleneck when it manages the IOPS for multiple SSDs.

FIG. 1 illustrates a prior art figure showing a data path 145 for a traditional storage server 100. The storage server 100 includes a processing device 105, a root complex 110, a memory 115, a switch 120, and multiple endpoint drives (e.g., disk drives) 125, 130. All I/O operations pass through the root complex 110 for the storage server 100 to an endpoint drive 125, 130. Accordingly, the data path 145 passes through the processing device 105 and through the root complex 110. As a result, the processing device 105 and root complex 110 can act as a bottleneck for the storage server 100 and limit performance.

BRIEF DESCRIPTION OF THE DRAWINGS

The embodiments described herein will be understood more fully from the detailed description given below and from the accompanying drawings.

DETAILED DESCRIPTION

Figure 1:
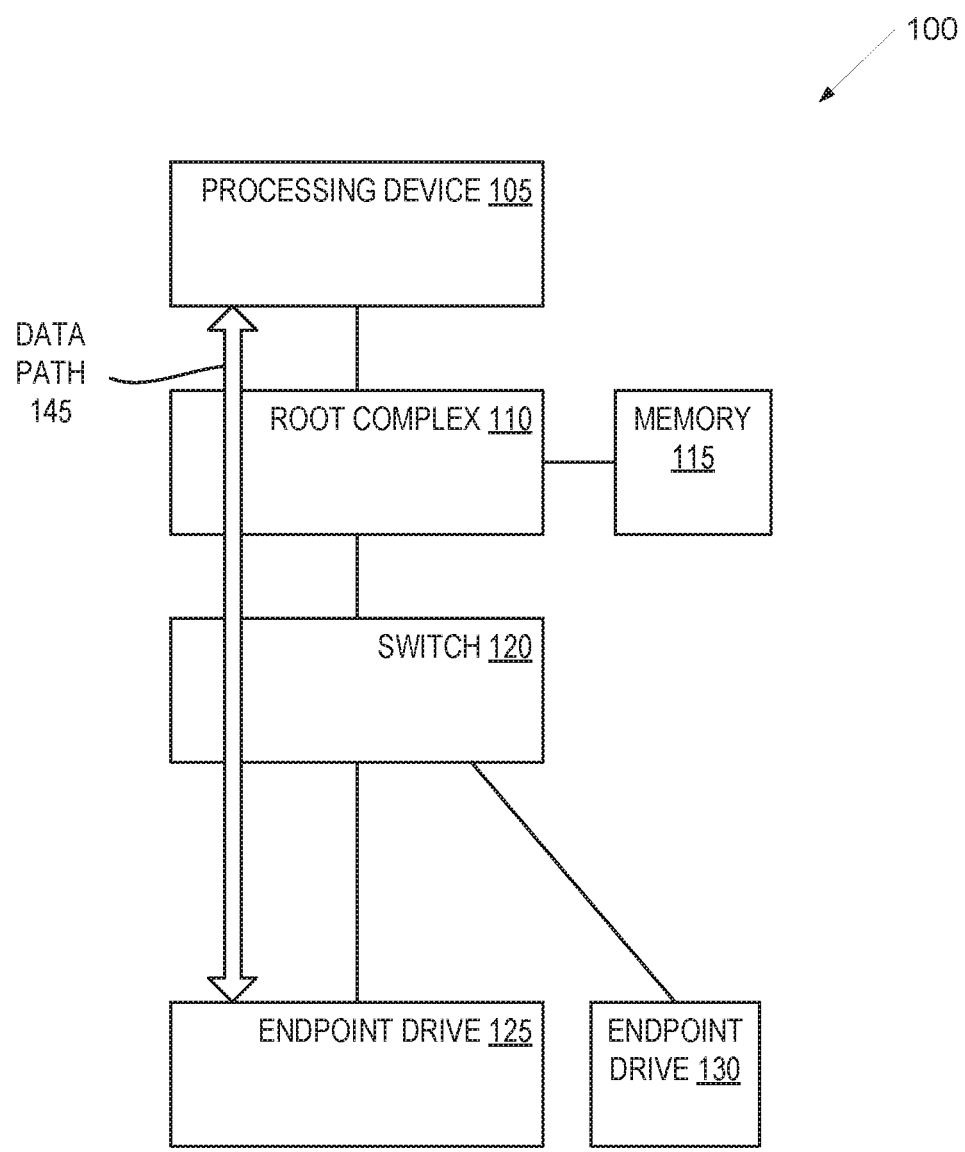
FIG. 1 is a block diagram example of a data path for a prior art storage server.

Described herein are embodiments of a storage server that includes multiple different processing devices (e.g., I/O controllers) that operate in parallel to manage data accesses to an array of solid state drives (SSDs). The storage server is configured such that a root complex for the storage server is not in a data path for any of the data accesses that include the processing devices and the SSDs. Accordingly, a module (e.g., a management controller) that includes the root complex does not operate as a bottleneck for accesses to the array of SSDs. This enables the storage server to handle tens of millions of IOPS.

In embodiments, a storage server includes an array of SSDs, wherein each of the SSDs in the array may have multiple queue pairs. The storage server additionally includes multiple input/output (I/O) controllers that read from and write to the array of SSDs and one or more switches that connect the I/O controllers to the array of SSDs. The storage server additionally includes a management controller that is also connected to the one or more switches. The management controller may include a root complex for the storage server, and may determine a number of queue pairs that are available for allocation on each SSD in the array of SSDs. Each queue pair includes one or more submission queues and one or more completion queues. The management controller may then allocate subsets of the queue pairs of the SSDs to the different I/O controllers. For example, a first SSD may have a set of queue pairs, which may be divided into queue pair subsets. The management controller may allocate a first subset of the set of queue pairs to a first I/O controller and a second subset of the set of queue pairs to the second I/O controller. The first I/O controller may then use first subset of queue pairs to read from and write to the first SSD and the second I/O controller may use the second subset of queue pairs to read from and write to the first SSD. The first and second I/O controllers may access the first SSD in parallel using their respective queue pair subsets.

In further embodiments, a first I/O controller of a storage server sends a first command to a first solid state drive (SSD) of an array of SSDs in the storage server via a first submission queue of a first queue pair of the first SSD that has been allocated to the first I/O controller. The first command may be a first read command or a first write command. The first I/O controller then receives a first acknowledgement from the first SSD that the first command has been completed via a first completion queue of the first queue pair of the first SSD that has been allocated to the first I/O controller. Additionally, a second I/O controller of the storage server sends a second command to the first SSD of the storage server via a second submission queue of the second queue pair of the first SSD that has been allocated to the second I/O controller, wherein the second command is a second read command or a second write command. The second I/O controller then receives a second acknowledgement from the first SSD that the second command has been completed via a second completion queue of the second queue pair of the first SSD that has been allocated to the second I/O controller. The reads and/or writes may be sent to the SSD by the first and second I/O controllers concurrently. The first and second I/O controllers may additionally send read and/or write commands to other SSDs in the array of SSDs using submission queues of queue pair subsets of those other SSDs. This enables each I/O controller to write to and read from multiple SSDs in parallel and additionally enables each SSD to perform read and write operations from multiple different I/O controllers in parallel. As a result, the storage server is able to utilize the full IOPS potential of all of the SSDs in the storage array.

In traditional storage servers, and in particular those that use peripheral component interconnect (PCI) and peripheral component interconnect express (PCIe), no more than a single controller (and a single root complex) is able to utilize the submission queues and completion queues of storage devices on the storage servers. In contrast, embodiments provide a storage server that divides queue pairs (comprising submission queues and completion queues) of SSDs into queue pair subsets, and generates virtual drives containing virtual queue pairs (with each virtual queue pair comprising a virtual submission queue and a virtual completion queue) that enable multiple controllers to access the SSDs via the queue pair subsets (each comprising a submission queue and a completion queue).

Figure 2:
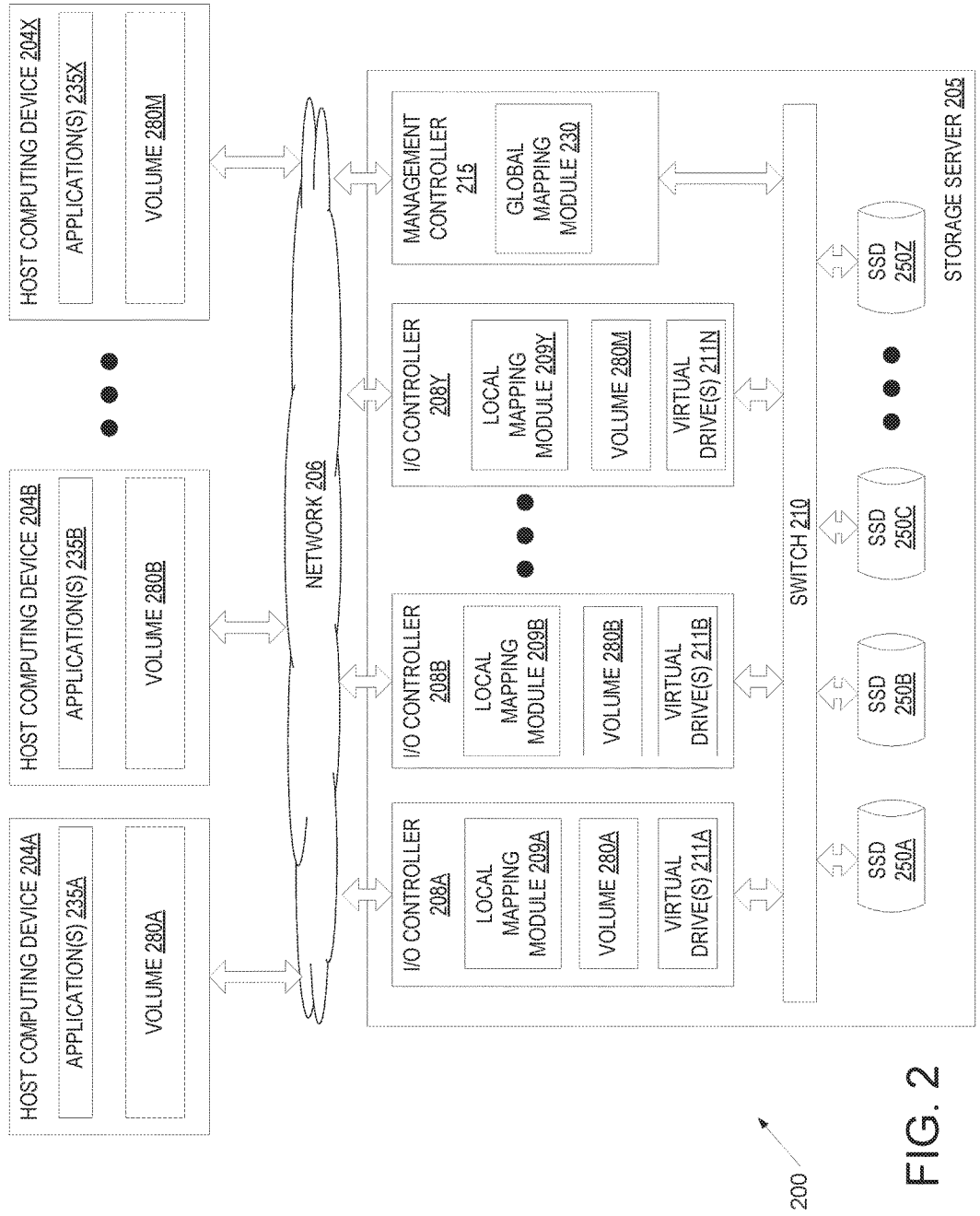
FIG. 2 is a block diagram of a network architecture that includes a storage server, in accordance with embodiments of the present invention.

FIG. 2 is a block diagram of a network architecture 200 that includes a storage server 205, in accordance with embodiments of the present invention. The network architecture 200 may include one or more host computing devices (e.g., host computing devices 204A, 204B through 204X) connected to the storage server 205 via a network 206. Network 206 may be a wide area network (WAN) such as the Internet, a local area network (LAN), a storage area network (SAN) or a combination thereof. The host computing devices 204A-X and/or storage server 205 may connect to the network 206 via an Ethernet, Fibre Channel (FC), Fibre channel over Ethernet (FCoE), Infiniband®, serial attached small computer system interface (SAS) or serial ATA (SATA) protocol. Alternatively, other protocols may be used to connect to the network 206.

Host computing devices 204A-X may each include a physical machine and/or a virtual machine hosted by a physical machine. The physical machine may be a rackmount server, a desktop computer, or other computing device. In one embodiment, one or more host computing device 204A-X includes a virtual machine managed and provided by a cloud provider system. Each virtual machine offered by a cloud service provider may be hosted on a physical machine configured as part of a cloud. Such physical machines are often located in a data center. The cloud provider system and cloud may be provided as an infrastructure as a service (IaaS) layer. One example of such a cloud is Amazon's® Elastic Compute Cloud (EC2®).

Each host computing device 204A-X may host one or more applications 235A, 235B through 235X. The applications 235A-X may be application servers, web servers, standalone applications, and so forth. Accordingly, host computing devices 204A-X may provide services to clients via applications 235A-X in some embodiments.

Each host computing device 204A-X may additionally mount or otherwise connect to one or more volumes 280A, 280B through 280M (e.g., one or more logical unit numbers (LUNs) and/or one or more virtual NVMe drives). Each volume 280A-M is a virtual drive that maps to one or more other virtual drives 211A, 211B through 211N. The term volume is used to distinguish these virtual drives from lower level virtual drives 211A-N. Though each host computing device 204A-X is shown to mount a different volume 280A-M, different host computing devices may mount or connect to the same volume. Each volume 280A-M is a logical storage device that maps a first logical storage address space that is presented to a host to a second logical storage address space of one or more underlying virtual drives 211A-N. The underlying virtual drives 211A-N may in turn map the second logical address space to physical storage address spaces of multiple storage devices (e.g., solid state drives (SSDs) 250A, 250B, 250C through 250Z of storage server 205).

Storage server 205 is a computing device that is configured and optimized to provide storage to client computing devices (e.g., to host computing devices 204A-X), which may be remote computing devices. Storage server 205 may be configured as a storage area network (SAN), network attached storage (NAS), or other remote storage type. Though a single storage server 205 is shown, the host computing devices 204A-X may connect to multiple storage servers. The multiple storage servers may be arranged in a cluster or other configuration.

Storage server 205 includes multiple I/O controllers 208A, 208B through 208Y connected to multiple solid state drives (SSDs) 250A, 250B, 250C through 250Z via a switch 210. The SSDs 250A-Z may be SAS/SATA drives, non-volatile memory express (NVMe) drives, Peripheral Component Interconnect (PCI) drives, Peripheral Component Interconnect Express (PCIe®) drives, small computer system interface (SCSI) over PCIe (SOP) drives, and/or solid state drives that communicate using different protocols. The number of SSDs included in storage server 205 may be less than 20 to more than 200. The solid state drives may have the same or different storage capacities. In some implementations, the number of host computing devices 204A-X, the number of I/O controllers 208A-Y, and the number of SSDs 250A-Z may be different from each other.

Each I/O controller 208A-Y is a device configured to connect one or more host computing devices 204A-X to one or more SSDs 250A-Z. Each I/O controller 208A-Y includes one or more network interface controllers (NICs) such as Ethernet NICs and/or other protocol adapters (e.g., such as FC, SAS/SATA, or Infiniband (IB) adapters) that connect that I/O controller to network 206. Each I/O controller 208A-Y additionally includes a port that connects to switch 210 via an internal bus. Though only a single switch 210 is shown, the I/O controllers 208A-Y may include multiple ports for connecting to multiple different switches and associated fabrics.

In one embodiment, I/O controllers 208A-Y include peripheral component interconnect express (PCIe) ports that connect to switch 210 via a PCIe link. Alternatively, or additionally, I/O controllers 208A-Y may include small computer system interface (SCSI) ports, serial attached SCSI (SAS) ports, serial ATA (SATA) ports, Fibre Channel ports, or universal serial bus (USB) ports or other ports for connecting to the switch 210. I/O controllers 208A-Y may additionally include a volatile and/or non-volatile memory to store firmware and/or software for performing operations described herein. Volatile memory may also be used for a data cache or buffer (e.g., as a write cache and/or a read look ahead cache). For example, I/O controllers 208A-Y may include a main memory (e.g., read-only memory (ROM), flash memory, dynamic random access memory (DRAM) such as synchronous DRAM (SDRAM), etc.) and a static memory (e.g., flash memory, static random access memory (SRAM), etc.).

I/O controllers 208A-Y may additionally include a processing device representing one or more general-purpose processors such as a microprocessor, central processing unit (CPU), or the like. Additionally, I/O controllers 208A-Y may each include a root complex (e.g., a PCI root complex) that acts as a local root complex for just the I/O controller 208A-Y. The root complex may be integrated into the processing device or may be a separate component of the I/O controller 208A-Y. In one embodiment, each I/O controller 208A-Y is a system on a chip (SoC) including a processing device, a memory, one or more NICs, one or more internal ports and/or a discrete root complex.

Each I/O controller 208A-Y is assigned to one or more host computing devices 204A-X, includes one or more of the volumes 280A-M that are used by the host computing devices 204A-X, and handles input/output (I/O) commands for those host computing devices. Each volume 280A-M is assigned to one or more host computing device 204A-X. In one embodiment, only one host computing device 204A-X is able to write to a volume 280A-M at a time, but more than one host computing device 204A-X is able to read from the same volume 280A-M at a time.

Each I/O controller 208A-Y may additionally include one or more virtual drives 211A-N. A volume 280A-M may be an aggregation of multiple virtual drives 211A-N. For example, in one embodiment, each I/O controller 208A-Y includes a separate virtual drive for each SSD 250A-Z accessed by the I/O controller. Each volume 280A-M maps to one or more virtual drives 211A-N. Each virtual drive 211A-N may map to one or more SSD 250A-Z. In other words, a virtual drive 211A-N may be an aggregation of multiple SSDs 250A-Z.

Applications 235A-X running on a host computing device 204A-X may attempt to read data from and/or write data to a volume 280A-M that the host computing device 204A-X has access to (e.g., that has been presented to the host computing device 104A-X). Responsive to such a read or write request, the host computing device 204A-X sends a host command to the I/O controller 208A-Y that is assigned to that host computing device 204A-X to initiate the read or write operation. As used herein, a host command is a read or write command that originates at a host computing device.

When the I/O controller 208A-Y receives a read or write request from the host computing device 204A-X, the I/O controller 208A-Y determines which virtual drives 211A-N, and then which SSDs 250A-Z, to read data from or write data to. The I/O controller 208A-Y may then generate one or more sub-commands directed to the determined SSDs 250A-Z to write data to those SSDs or read data from those SSDs 250A-Z. The I/O controller 208A-Y may then receive write acknowledgements or read data from the SSDs and then provide a write acknowledgement or the read data to the host computing device 204A-X.

Switch 210 is a multi-port bridge that connects I/O controllers 208A-Y to SSDs 250A-Z. Switch 210 manages the flow of data within storage server 205 by connecting specific I/O controllers 208A-Y to specific SSDs 250A-Z on a message by message basis, allowing the switch 210 to regulate the flow of traffic. Each I/O controller 208A-Y and each SSD 250A-Z connected to switch 210 can be identified using a unique address that has been assigned to the I/O controller or SSD. Switch 210 may be a PCIe switch, an Ethernet switch, a SAS or SATA expander, a USB switch, or other type of switch.

Each solid state drive (SSD) 250A-Z (also referred to as a solid state storage device) is a non-volatile storage device that uses integrated circuits to persistently store data. SSDs 250A-Z have numerous advantages over traditional disk drives. As compared to disk drives, SSDs are more resilient, consume less power, and have lower latency (access times). Additionally. SSDs are able to perform many more IOPS than disk drives. For example, an SSD may perform millions of IOPS compared to hundreds or thousands of IOPS that may be performed by a disk drive. In one embodiment, SSDs 250A-Z are NAND-based Flash memory devices or NOR-based Flash memory devices. Flash memory devices are non-volatile and can be electronically erased and reprogrammed. Alternatively, one or more SSDs 250A-Z may be volatile memory-based solid state drives (e.g., dynamic random access memory (DRAM)-based SSDs) that have a battery backup. SSDs 250A-Z may include one or more ports (e.g., PCIe ports) to connect to switch 210. SSDs 250A-Z may connect to switch 210 via PCIe, SCSI, SAS, USB, or other connection protocols.

Each SSD 250A-Z has a controller and a storage area that includes memory (e.g., NAND Flash non-volatile memory) to store data. The storage area is divided into pages, which is the smallest unit of storage to which data may be stored. SSD pages may have sizes based on a configuration of an SSD. For example, SSDs 250A-Z may have pages that are 4 kilobytes (kB), 8 kB, or 26 kB. However, other page sizes are also possible. SSD pages are grouped into blocks. Each block contains a particular number of pages, which is again dependent on a design of a particular SSD. Typical SSDs have blocks that include 256 pages.

Storage server 205 additionally includes a management controller 215. Management controller 215 may be a device configured to perform particular operations with regards to management of the array of SSDs 250A-Z. Management controller 215 may include a processing device, a port for connecting to switch 210 and a NIC for connecting to network 206. Management controller 215 may additionally include a volatile and/or non-volatile memory to store firmware and/or software for performing operations described herein. Additionally, management controller 215 may include a root complex (e.g., a PCI root complex) that acts as a root complex for the storage server. The root complex may be integrated into the processing device of the management controller 215 or may be a separate component of the management controller 215. In one embodiment, the management controller 215 is a system on a chip (SoC) including a processing device, a memory, one or more NICs, one or more internal ports and/or a discrete root complex.

The management controller 215 determines how to configure the array of SSDs 250A-Z and further determines configurations for the one or more volumes 280A-N and/or virtual drives 211A-N. For example, management controller 215 may determine which volumes 280A-M map to which virtual drives 211A-N, which virtual drives 211A-N map to which SSDs 250A-Z, and which portions of those SSDs the virtual drives 211A-N map to. Once these configurations are determined, management controller 215 may send these configurations to the I/O controllers 208A-Y for implementation. Management controller 215 additionally performs discovery operations and may be responsible for pairing volumes on I/O controllers 208A-Y with host computing devices 204A-X.

In order for volumes 280A-M to be generated, SSDs to be allocated to I/O controllers 208A-Y and virtual drives 211A-N, virtual drives 280A-N to be allocated to volumes 280A-M, and data paths to be set up between host computing devices 204A-X and I/O controllers 208A-Y and between I/O controllers 208A-Y and SSDs 250A-Z, the storage server performs a set of initiation operations. These initiation operations include discovery operations and configuration operations. The initiation operations (e.g., discovery operations and configuration operations) may be initiated when storage server 205 powers on.

Each of the I/O controllers 208A-Y includes a local mapping module 209A-Y that performs discovery and configuration operations within a domain of that I/O controller 208A-Y. In one embodiment, the local mapping module 209A-Y includes or operates in conjunction with a root complex for an I/O controller 208A-Y. The root complex may act as a memory manager for that I/O controller 208A-Y. The local mapping module 209A-Y identifies a port (e.g., a PCIe port) of the I/O controller 208A-Y associated with the local mapping module 209A-Y. The local mapping module 209A-Y then assigns a memory address range of the I/O controller's memory for the port and records an entry that maps the port to the memory address range in a memory map. Each I/O controller has its own memory map, referred to herein as a local memory map. The local memory map of an I/O controller includes the address ranges that can be used to access different devices in the domain of the I/O controller.

The memory address range represents an address range that will act as a buffer for reads and writes and as a window to access the I/O controller. Accordingly, to satisfy read and write commands from host computing devices 204A-X, data will be temporarily written into the memory address range. The full memory address range will be addressable by SSDs 250A-Z, other I/O controllers 208A-Y and/or the management controller 215 through the port. In one embodiment, the memory address range has a size of 128 Megabytes (MB). Alternatively, other sized memory address ranges may be used. For example, memory address ranges allocated to ports by local mapping modules 209A-Y may have a size of 64 MB, 256 MB, 512 MB, and so on.

Management controller 215 includes a global mapping module 230 that performs discovery and configuration operations within a domain of the management controller 215. In one embodiment, the global mapping module 230 includes or operates in conjunction with a root complex for the management controller 215. The root complex may act as a memory manager for the entire storage server 205. Each of the I/O controllers 208A-Y, the switch 210 and the SSDs 250A-Z are in the domain of the management controller 215.

Figure 3:
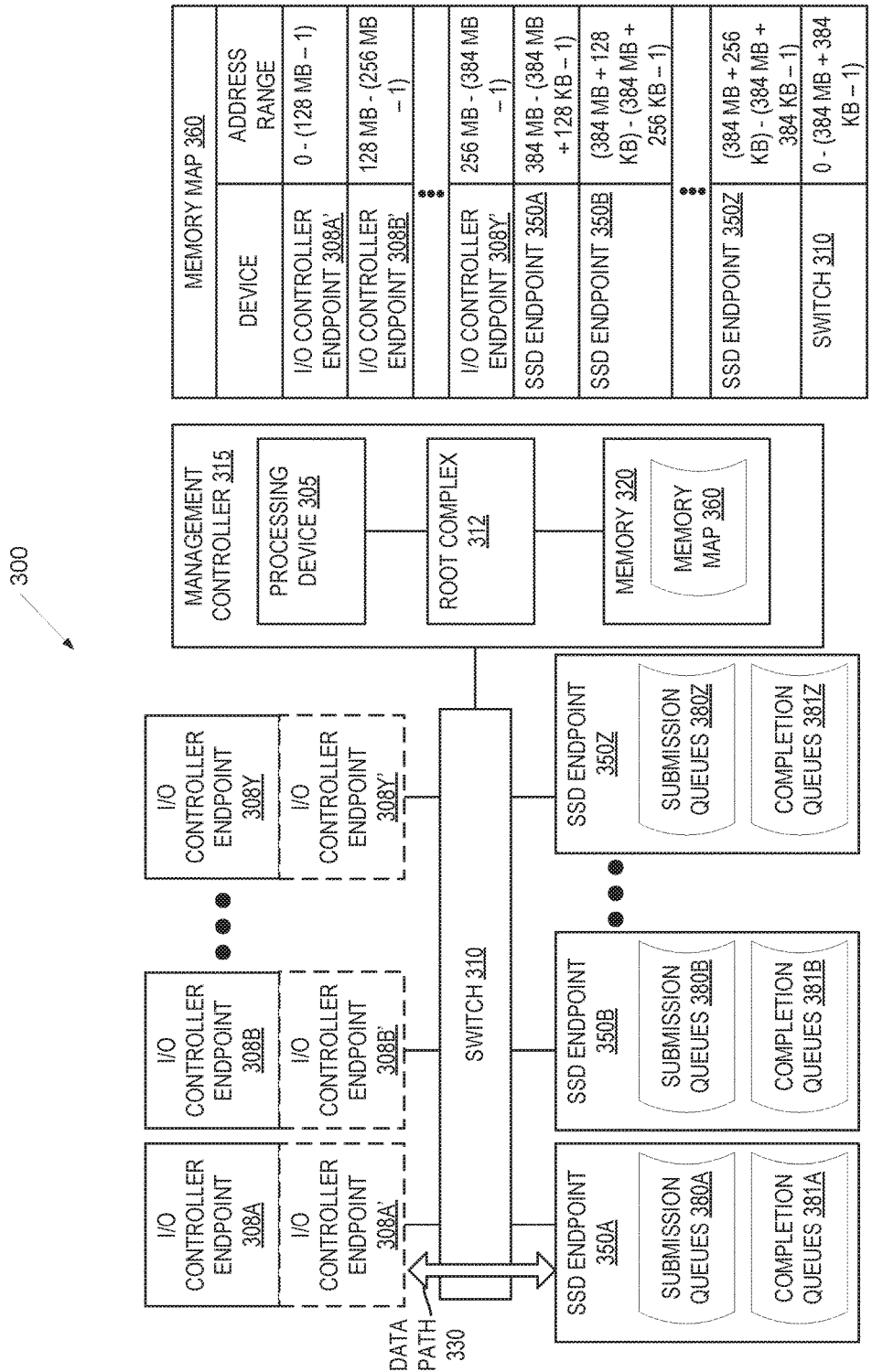
FIG. 3A is a block diagram example of a data path for a storage server, in accordance with embodiments of the present invention.
FIG. 3B is a block diagram example of a memory map of a management controller, in accordance with embodiments of the present invention.

Management controller 215 performs discovery operations to identify the switch 210, each of the SSDs 250A-Z and each of the I/O controllers 208A-Y. The global mapping module 230 discovers each device in the storage server 205, and identifies that device as a switch port or an endpoint port. Each port of the switch 210 is identified as a switch port. Each I/O controller 208A-Y and SSD 250A-Z is identified as an endpoint port. The management controller 215 is identified as a root port. Notably, the I/O controllers 208A-Y and SSDs 250A-Z are set up as endpoints (and thus peers) within the storage server 205. The peer-to-peer relationship between SSDs 250A-Z and I/O controllers 208A-Y is shown with reference to FIG. 3A.

When a device is discovered by global mapping module 230, global mapping module 230 determines an amount of memory to assign to that device and then assigns a memory address range of the management controller's memory to that device. The memory address range allocated to a device represents memory addresses of the management controller's 215 memory that can be used to access that device. Management controller 215 generates a memory map (referred to herein as a global memory map) that contains entries for each of the SSDs 250A-Z, the switch 210, each of the I/O controllers 208A-Y and the management controller 215. The memory map holds the memory addresses that have been assigned to all devices in the storage server and that can be used to access those devices in the domain of the management controller.

Assigning a memory address range to a device may include adding an entry to a memory map of the management controller that includes the device and the memory address range, and may additionally include notifying the device of the memory address range that has been assigned to it. An entry in the memory map may include a bus identifier (ID) for a link or bus that the device is attached to, a device identifier (ID) for the device, and a function identifier (ID) for a function of the device. Note that for PCIe a link and not a bus is technically used. However, standard terminology for the link is a "bus". The device ID may identify a specific device under a link or bus topologically and/or may be assigned to the device by the global mapping module 230. There may be multiple devices under a link or bus. The function ID may identify a function of a device (e.g., an SSD function, a switch function, an I/O controller function, and so on). Devices may have one or more functions.

Management controller 215 may query some devices (e.g., SSDs 250A-Z) to determine an amount of memory to assign to that device. The queried devices may request a specific amount of memory. For example, an SSD 250A-Z may request an amount of memory that is needed to address all of the submission queues, completion queues and other control structures of the SSD. In examples, some SSDs may request 16 kilobytes (kB) of memory, some SSDs may request 8 kB of memory, some SSDs may request 32 kB of memory, and/or other SSDs may request other amounts of memory.

Management controller 215 may also automatically determine an amount of memory to assign to a device based on the device type for that device (e.g., the function of the device). For example, management controller 215 may automatically determine a size of a memory address range to assign to a device after identifying the device as an I/O controller 208A-Y. In one embodiment, each I/O controller 208A-Y is assigned the same amount of memory of the management controller 215. For example, a port for each I/O controller 208A-Y may be assigned a memory address range of the management controller 215 having a size of 128 MB in one embodiment.

Global mapping module 230 may also perform other operations to configure the device. For example, global mapping module 230 may determine a number of queue pairs in each SSD 250A-Z, divide the queue pairs into queue pairs subsets, and allocate the submission queue subsets to I/O controllers. Such operations are discussed in greater detail below.

FIG. 3A is a block diagram example of a data path 330 for a storage server 300, in accordance with embodiments of the present invention. The storage server 300 includes multiple I/O controllers, each of which includes at least one port. The storage server 300 additionally includes multiple SSDs, each of which includes at least one port, a collection of submission queues 380A, 380B through 380Z, and a collection of completion queues 381A, 381B through 381Z. The storage server additionally includes a management controller 315 that includes a processing device 305, a root complex 312 and a memory 320. Though the processing device 305 is shown as a separate component from the root complex 312, in some embodiments the root complex 312 is integrated into the processing device 305. In one embodiment, the storage server 300 corresponds to storage server 205 of FIG. 2.

Responsive to the storage server 300 being powered on, each of the I/O controllers performs discovery operations and identifies a port of that I/O controller. The port is identified by the I/O controller 208A-Y as an I/O controller endpoint 308A-Y. The I/O controller assigns the I/O controller endpoint 308A-Y for that I/O controller a memory range of the I/O controller that can be used to access that port from a domain of the I/O controller. The I/O controller will be unable to determine any devices that are beyond that port. Accordingly, the I/O controller may not be able to discover the switch 310, and SSDs or any other I/O controllers in the storage server 300. Each I/O controller generates a local memory map and assigns a memory address range of the I/O controller to the identified port in the local memory map.

Responsive to the storage server being powered on, the management controller 315 also performs discovery operations. The management controller 315 identifies the switch 310, each SSD, and each I/O controller. Specifically, the management controller 315 may identify a port of each SSD as an SSD endpoint 350A, 350B, through 350Z. The management controller 315 may additionally identify a port of each I/O controller as an I/O controller endpoint 308A'-308Y'. The management controller 315 generates a memory map 360 and adds an entry to the memory map 360 for the switch 310 and for each SSD endpoint 350A-Z and each I/O controller endpoint 308A'-308Y'. Each entry in the memory map 360 includes a memory address range of the memory 320 in the management controller 315 that has been allocated to a particular device (e.g., to an I/O controller endpoint 308A'-Y', to switch 310 or to an SSD endpoint 350A-Z).

The management controller 315 determines a number of queue pairs available on each of the SSDs during discovery, where each queue pair comprises one of submission queues 380A-Z and one of completion queues 381A-Z. In one embodiment, the submission queues and completion queues are nonvolatile memory express (NVMe) queues arranged in queue pairs. In an example, SSD endpoint 350A may include 128 queue pairs and SSD endpoint 350B may include 256 queue pairs.

In addition to allocating memory address ranges of the memory 320 to I/O controllers and to SSDs, management controller 315 additionally divides up queue pairs (e.g., comprising the submission queues 380A-Z and completion queues 318A-Z) of SSDs and assigns subsets of those queue pairs (e.g., comprising submission queues 380A-Z and completion queues 381A-Z) to the different I/O controllers. For example, if SSD endpoint 350A includes a set of 128 submission queues 380A, then management controller may allocate a first subset of submission queues 1-20 to I/O controller endpoint 308A and a second subset of submission queues 21-40 to I/O controller endpoint 308B. Management controller 315 may then notify the I/O controllers of the subsets of queue pairs that are allocated to them.

Notably, each I/O controller has an I/O controller endpoint 308A-Y entry in a local memory map of the I/O controller and an I/O controller endpoint 308A'-Y' entry in the memory map 360, which is a global memory map of the storage server 300. The size of the memory address range allocated to an I/O controller endpoint 308A-Y is the same size of the memory address range allocated to a corresponding I/O controller endpoint 308A'-Y' in embodiments. Accordingly, 128 MB of memory of an I/O controller may be allocated to a port of the I/O controller and 128 MB of the memory 320 of the management controller 315 may be allocated to the port of the I/O controller. However, the memory address range of the I/O controller's memory that has been allocated to an I/O controller endpoint 308A-Y may be completely different from the memory address range of the management controller's memory 320 that has been allocated to the corresponding I/O controller endpoint 308A'-Y'. For example, an I/O controller may allocate memory region 0-128 MB to a port of the I/O controller, and management controller 315 may allocate memory region 128-258 MB to the port of the I/O controller. A memory address translation is performed at the border of the I/O controller endpoints 308A-Y and the I/O controller endpoints 308A'-Y' when data and commands cross the border.

Though the management controller 315 includes the root complex 312 for the storage server 300, the management controller 315 (and the root complex 312) are not in a data path 330 for the storage server 300. The I/O controllers and SSDs are both set up as endpoints, and thus are peers. In traditional storage servers, as shown in FIG. 1, the data path is through the root complex. The root complex in such storage servers is the only entity that is able to access the SSDs, and so all data reads and writes flow through the root complex. In contrast, as shown in FIG. 3A the data path 330 is between peer endpoints (e.g., between I/O controller endpoints and SSD endpoints), and does not flow through the root complex 312. This enables the use of multiple I/O controllers (e.g., multiple processing devices) to manage reads and writes to the SSDs in the storage server 300. Accordingly, embodiments described herein enable efficient scaling of the number of SSDs. In other words, embodiments enable many more SSDs to be used in a single storage server than has heretofore been feasible.

FIG. 3B is a block diagram example of the memory map 360 of management controller 315, in accordance with embodiments of the present invention. As shown, I/O controller endpoint 308A' has been allocated address range 0-(128 MB-1). I/O controller endpoint 308B' has been allocated address range 128 MB-(256 MB-1). I/O controller endpoint 308Y' has been allocated address range 256 MB-(384 MB-1). SSD endpoint 350A has been allocated address range 384 MB-(384 MB+128 kB-1). SSD endpoint 350B has been allocated address range (384 MB+128 kB)-(384 MB+256 kB-1). SSD endpoint 350Z has been allocated address range (384 MB+256 kB)-(384 MB+384 kB-1). Switch has been allocated address range 0-(384 MB+384 kB-1). The address range allocated to switch 310 may encompass the address ranges of all of the I/O controller endpoints and all of the SSD endpoints. This may enable messages sent to any of the endpoints to first be sent to the switch 310. The switch 310 may then route the messages to the appropriate endpoints based on the addresses to which the messages are addressed. In one embodiment, the management controller 315 sends the memory map 360 or a portion of the memory map 360 to the switch to enable the switch to correctly route messages between endpoints.

Figure 4:
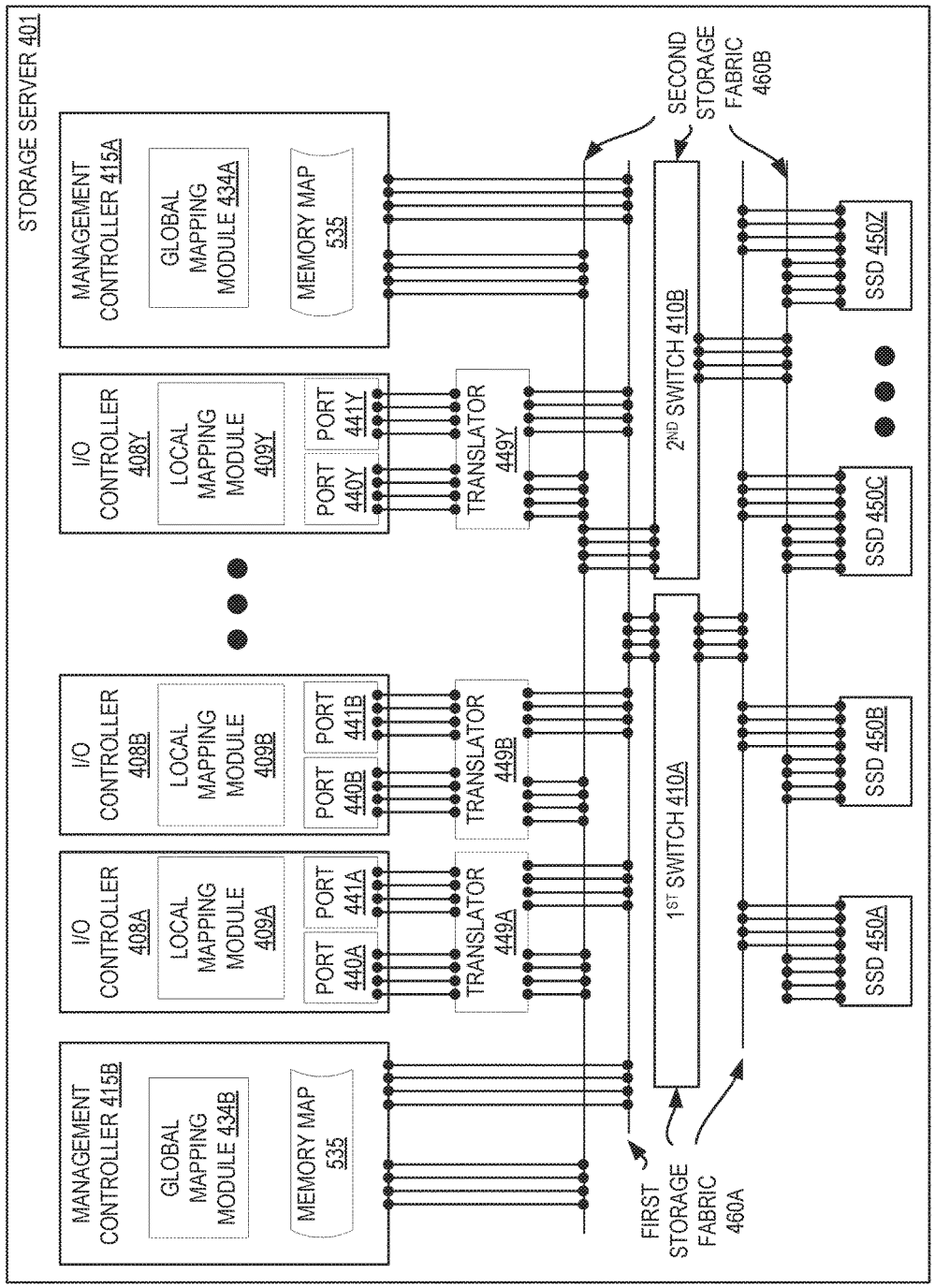
FIG. 4 is a block diagram of a storage server, in accordance with embodiments of the present invention.

FIG. 4 is a block diagram of a storage server 401, in accordance with embodiments of the present invention. In one embodiment, storage server 401 corresponds to storage server 205 of FIG. 2 and/or storage server 300 of FIG. 3. Storage server 401 includes multiple I/O controllers 408A, 408B through 408Y that are each connected to a first storage fabric 460A and a second storage fabric 460B.

A backplane of the storage server 401 includes a first storage fabric 460A and a second storage fabric 460B. Each storage fabric 460A-B includes hardware (e.g., switches, etc.) that connects I/O controllers 408A-Y to SSDs 450A-Z. Each storage fabric 460A-B may include a fabric board (e.g., a printed circuit board (PCB) that includes multiple hardware components. Alternately, multiple storage fabrics may be part of a single backplane printed circuit board (PCB). Each storage fabric 460A-B enables any I/O controller 408A-Y and any management controller 415A-B to connect to any SSD 450A-Z. Each storage fabric 460A-B may be independent of other storage fabrics, using its own hardware, ports, connections, etc. that are distinct from those used by the other storage fabrics. Accordingly, if any component in a storage fabric 460A-B fails and causes that storage fabric to fail, the I/O controllers 408A-Y may continue to maintain connections to the SSDs 450A-Z via an alternative storage fabric.

In one embodiment, storage server 401 includes a first storage fabric 460A and a second storage fabric 460B. In alternative embodiments, storage server may include more than two storage fabrics. Each storage fabric 460A-B may include its own connectors, ports, hardware (e.g., switches), and so on that are separate and distinct from those of other storage fabrics. For example, first storage fabric 460A includes a first switch 410A (which may include multiple switches) and second storage fabric 460B includes a second switch 410B (which may include multiple switches).

First storage fabric 460A includes a first switch 410A (which may be implemented as multiple switches). The first switch 410A may be a multi-port bridge that connects I/O controllers 408A-Y to SSDs 450A-Z. Second storage fabric 460B includes a second switch 410B (which may be implemented as multiple switches). The second switch 410B may be a multi-port bridge that connects I/O controllers 408A-Y to SSDs 450A-Z. First switch 410A and second switch 410B may include a PCIe switch, an Ethernet switch, a SAS or SATA expander, a USB switch, or other type of switch. First storage fabric 460A and second storage fabric 460B manage the flow of data within storage server 401 by connecting specific I/O controllers 408A-Y to specific SSDs 450A-Z on a message by message basis, allowing the storage fabrics 460A-B to regulate the flow of traffic.

Each SSD 450A-Z includes one or more physical port that is capable of connecting to the first storage fabric 460A and the second storage fabric 460B. In one embodiment, multiplexers are used to connect SSDs to multiple storage fabrics. Each SSD may be actively connected to one storage fabric at a time. I/O controllers 408A-Y are similarly coupled to both the first storage fabric 460A and second storage fabric 460B. As shown, each I/O controller 408A-Y may include two ports 440A-440Y and 441A-441Y. Each I/O controller may be actively connected to one storage fabric at a time through one of its ports. At any time an I/O controller 408A-Y may switch to use of its other port to disconnect from one storage fabric and connect to another storage fabric.

One or both management controllers 415A-B may determine which storage fabric 460A, 460B to make active for each of the I/O controllers 408A-Y and for each of the SSDs 450A-Z. A management controller 415A-B may then send a message to one or more SSD 450A-Z and/or to one or more I/O controller 408A-Y indicating which of the storage fabrics to connect to. At any time the management controller 415A-B may determine to make a different storage fabric active for an SSD and/or I/O controller, and may send a new message notifying the SSD and/or I/O controller to switch to that storage fabric.

During an initiation process, a local mapping module 409A, 409B, through 409Y of each I/O controller 408A-Y performs discovery. A local mapping module 409A discovers port 440A and port 441A. Local mapping module 409A allocates a first memory address range of a memory of the I/O controller 408A to the port 440A and allocates a second memory address range of the memory to port 441A. Local mapping module 409A adds an entry to a local memory map of the I/O controller 408A for each of the ports. Each of the other local mapping modules 409B-Y performs similar operations.

During the initiation process for the storage server 401, a peer election algorithm determines which one of management controller 415A or management controller 415B will be active. The other management controller 415A-B will be on standby. The active management controller 415A-B will perform discovery operations and generate a global memory map. This management controller 415A-B will control both storage fabrics 460A-B. The passive management controller 415A-B will be ready to take over in the event that the active management controller 415A-B fails. A global mapping module 434A-B of the active management controller 415A-B may perform discovery and generate a global memory map 535 as discussed previously. The global memory map 535 may include entries for the first switch 410A, the second switch 410B, each of the I/O controllers 408A-Y and each of the SSDs 450A-Z.

After initiation is completed, the SSDs 450A-Z and I/O controllers 408A-Y may be divided into subsets. A first subset of SSDs 450A-Z and a first subset of I/O controllers 408A-Y may be actively connected to the first storage fabric 460A. This may include using multiplexers attached to the SSDs in the first subset of SSDs to switch those SSDs over to the first storage fabric 460A. Similarly, a second subset of SSDs 450A-Z and a second subset of I/O controllers 408A-Y may be actively connected to the second storage fabric 460B. This may include using multiplexers attached to the SSDs in the second subset of SSDs to switch those SSDs over to the second storage fabric 460B. In one embodiment, half of the SSDs and I/O controllers are routed to each of the storage fabrics. If a storage fabric fails, the I/O controllers and SSDs routed to that storage fabric may be rerouted to the other storage fabric.

Each I/O controller 408A-Y is capable of connecting to one or more hosts (also referred to as clients), and can read data from the SSDs and write data to the SSDs on behalf of those hosts. Each I/O controller 408A-Y includes a local memory map with memory address ranges allocated to multiple ports (e.g., port 440A and port 441A) of the I/O controller. Each management controller 415A-B additionally includes a global memory map with memory address ranges allocated to the multiple ports of the I/O controllers 408A-Y. As mentioned with reference to FIG. 3A, an I/O controller 408A-Y references data and commands using memory addresses in its own domain. However, outside of the I/O controller 408A-Y, a switch, a management controller and SSDs on a particular fabric all reference data and commands using memory addresses in the domain of the management controller. Accordingly, in one embodiment each I/O controller 408A-Y is connected to a translator 449A, 449B through 449Y.

A translator 449A-Y is a module that is configured to translate messages and commands between the domain (address space) of an I/O controller 408A-Y and the domain (address space) of a management controller 415A-B. A translator may be a discrete device (e.g., an integrated circuit or chip), may be a component of another device (e.g., a component of a port), or may be a logical module that executes on a processing device. The translator 449A may include a translation table, file or other translation data structure that maps memory addresses of the I/O controller's memory to memory addresses of the first management controller's 415A memory and to memory addresses of the second management controller's 415B memory.

In an example, when translator 449A receives a message from port 440A of I/O controller 408A that is directed to a first memory address of the I/O controller 408A that has been allocated to SSD 450A, translator 449A may translate that first memory address to a first memory address of the active management controller 415A-B. In another example, when translator 449A receives a message from port 441A of I/O controller 408A that is directed to a second memory address of the I/O controller 408A that has been allocated to SSD 450A, translator 449A may translate that second memory address of the I/O controller to a second memory address of the active management controller 415A-B. In another example, when translator 449A receives a message from SSD 450A that is directed to a first memory address of the active management controller 415A-B, translator 449A may translate the first memory address of the management controller 415A-B to a first memory address of the I/O controller that has been allocated to a particular port 440A, 440B of the I/O controller 108A. Accordingly, translators 449A-Y bridge the domains between the I/O controllers 408A-Y and the management controllers 415A-B.

Figure 5:
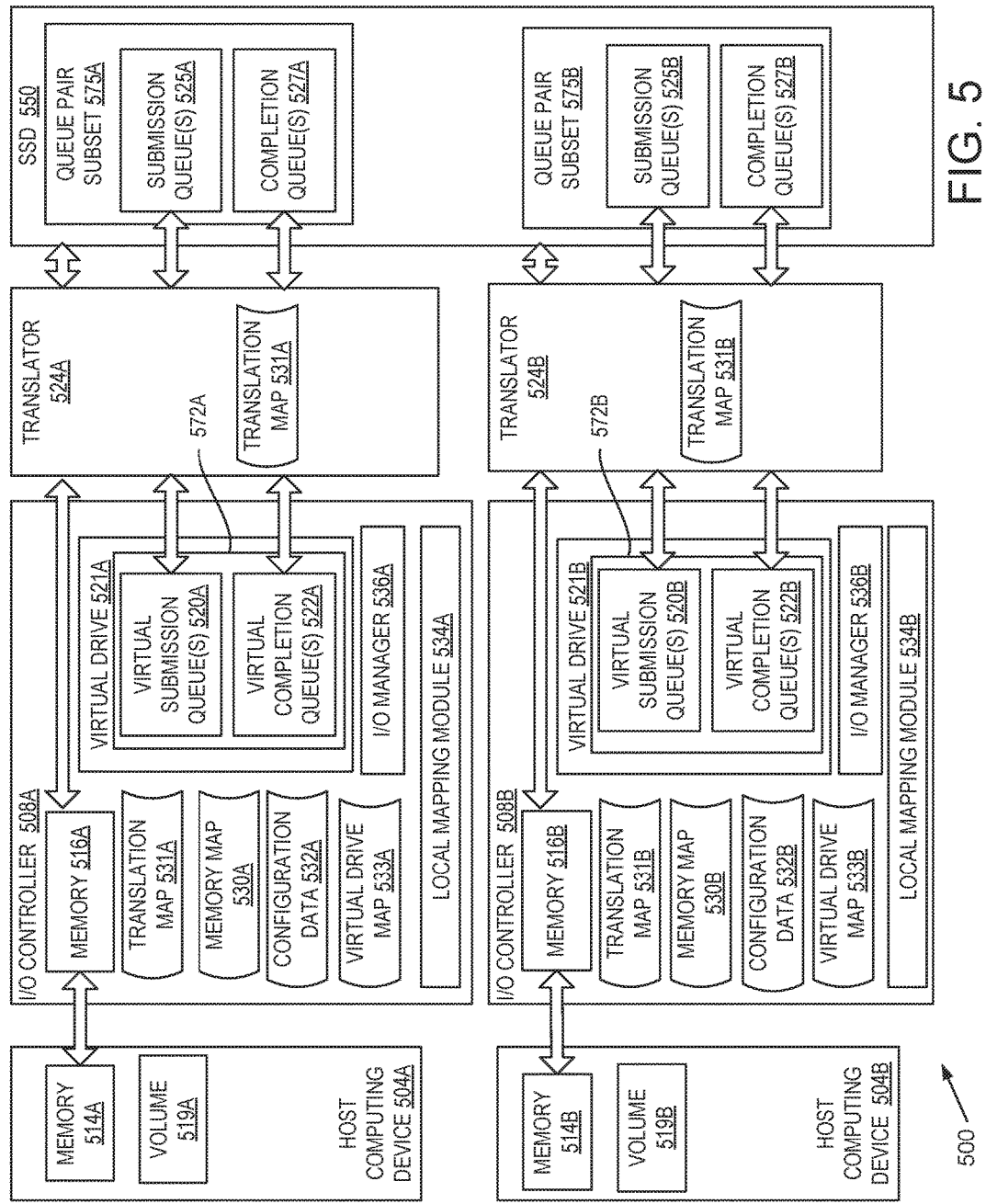
FIG. 5 is a block diagram showing multiple I/O controllers of a storage server that share access to an SSD using different queue pair subsets of the SSD, in accordance with embodiments of the present invention.

FIG. 5 is a block diagram showing multiple I/O controllers 508A, 508B of a storage server 500 that share access to an SSD 550 using different queue pair subsets of the SSD 550, in accordance with embodiments of the present invention. The storage server 500 may correspond to any of storage servers 200, 300 and 401 discussed above.

I/O controller 508A includes a memory 516A, a local mapping module 534A and an I/O manager 536A. Local mapping module 534A may include or operate in conjunction with a root complex of the I/O controller 508A and may include a software or firmware component. I/O manager 536A and/or local mapping module 534A may include a logical module that may be loaded into and executed by a processing device of I/O controller 508A. Alternatively, or additionally, I/O manager 536A and/or local mapping module 534A may include a physical module (e.g., an integrated circuit (IC) designed with described modules or a configurable logic such as a field programmable gate array (FPGA) configured to have the modules).

As discussed previously, local mapping module 534A is responsible for allocating memory address ranges of memory 516A to ports and/or other devices of I/O controller and generating a memory map 530A. The memory map 530A may include entries indicating the ports (and other devices of I/O controller 508A) and the memory address ranges allocated to those ports (and other devices). Local mapping module 534A may additionally receive configuration data 532A from one or more management controller of the storage server 500. The configuration data 532A may identify a number of SSDs and/or other I/O controllers included in the storage server, storage space of the SSDs that is allocated to intermediate high level virtual drive (referred to herein as a volume) 519A (shown mounted to host computing device 504A) to be used by the I/O controller, queue pair subsets allocated to the I/O controller 508A and/or to the volume 519A, memory address ranges of the management controller that have been allocated to the ports of the I/O controller, amounts of the memory 516A of the I/O controller 508A to allocate for communication with each of the SSDs, other I/O controllers and/or management controller, and other information.

Local mapping module 534A may use the configuration data 532A to generate a set of low level virtual drives (also referred to herein as meta-drives), where each low level virtual drive may correspond to one or more of the SSDs of the storage server (or to portions of one or more of the SSDs). For each low level virtual drive, local mapping module 534A may generate a set of virtual queue pairs that includes one or more virtual submission queues and one or more virtual completion queues. There may be a one to one relationship between a number of virtual submission queues and a number of virtual completion queues. Alternatively, a virtual queue pair set may include more virtual submission queues than virtual completion queues. The set of virtual queue pairs may correspond to a subset of queue pairs of the SSD that has been allocated to the I/O controller 508A by a management controller. For each low level virtual drive the local mapping module 534A may additionally allocate a portion of the memory address range that was allocated to a port of the I/O controller 508A. In one embodiment, a separate memory address range is allocated for each of the virtual submission queues and virtual completion queues in the set of virtual queue pairs for the virtual drive.

As shown in FIG. 5, I/O controller 508A includes low level virtual drive 521A that is a virtual representation of SSD 550. SSD 550 includes a set of queue pairs. A first queue pair subset 575A that includes a first submission queue subset 525A and a first completion queue subset 527A of SSD 550 has been allocated to I/O controller 508A. Accordingly, virtual drive 521A includes a virtual queue pair set 572A that includes a set of virtual submission queues 520A and a set of virtual completion queues 522A. The virtual queue pair set 572A corresponds to queue pair subset 575A. Accordingly, the set of virtual submission queues 520A corresponds to the submission queue subset 525A and the set of virtual completion queues 522A corresponds to the completion queue subset 527A.

Local mapping module 534A may additionally use the configuration data 532A and potentially information about the low level virtual drives and their virtual queue pairs to generate a translation map 531A. The translation map 531A may be a table, file or other data structure that maps memory address ranges of the I/O controller 508A that are allocated to low level virtual drives, to ports, and to other devices and/or virtual devices to memory address ranges of the management controller that are allocated to corresponding SSDs, I/O controllers and/or other devices. For example, translation map 531A may map a memory address range of I/O controller 508A that is allocated to a port of the I/O controller to a memory address range of the management controller that is allocated to the port of the I/O controller. The memory address range of the management controller that is assigned for the I/O controller 508A may or may not be of an equal size to the memory address range of the I/O controller 508A. Translation map 531A enables I/O manager 536A to translate the body of commands (e.g., NVMe commands) that are to be sent to SSDs from a domain (memory address space) of the I/O controller 508A to a domain (memory address space) of the management controller.

I/O controller 508B is similar to I/O controller 508A, and includes a memory 516B, a local mapping module 534B, an I/O manager 536B, a translation map 531B, a memory map 530B, configuration data 532B, a volume 519B (shown mounted to host computing device 504B) and a set of low level virtual drives or meta-drives, of which low level virtual drive 521B is shown. Low level virtual drive 521B is a virtual representation of SSD 550. SSD 550 includes a set of queue pairs. A second queue pair subset 575B that includes a second submission queue subset 525B and a second completion queue subset 527B of SSD 550 has been allocated to I/O controller 508B. Accordingly, virtual drive 521B includes a virtual queue pair set 572B that includes a set of virtual submission queues 520B and a set of virtual completion queues 522B. The virtual queue pair set 572B corresponds to queue pair subset 575B. Accordingly, the set of virtual submission queues 520B corresponds to the submission queue subset 525B and the set of virtual completion queues 522B corresponds to the completion queue subset 527B.

I/O managers 536A-B are responsible for communicating with host computing devices 504A, 504B and satisfying input/output (I/O) commands such as read commands and write commands from the host computing devices 405A-B. I/O manager 536A is responsible for satisfying read and write requests from host computing device 504A, while I/O manager 536B is responsible for satisfying read and write requests from host computing device 504B.

Host computing device 504A includes a high level virtual drive or volume 519A that has been mounted to the host computing device 504A. The virtual drive or volume 519A may be a virtual block device that includes logical block addresses (LBAs). These LBAs are referred to herein as host LBAs. When host computing device 504A connects to I/O controller 508A, the host computing device 504A and I/O controller 508A establish a remote direct memory access (RDMA) queue pair that includes and RDMA send queue and an RDMA receive queue. This includes establishing an area of a memory 514A of the host computing device 504A that I/O controller 508A can access using RDMA and establishing an area of memory 516A of I/O controller 508A that host computing device 504A can access using RDMA. In one embodiment, the area of memory 516A that host computing device is permitted to access using RDMA is the memory address range of memory 516 that has been allocated to the I/O controller's port.

When an application running on host computing device 504A issues a disk write or persist command, host computing device 504A generates a write request. Generation of the write request may include generating a work request element (WQE) in the RDMA send queue. The WQE may include a pointer to a location in memory 514A where the data to be written is stored, a pointer to a location in memory 516A where the data is to be written, and a host LBA of the volume 519A to which the data is to be written.

I/O manager 536A receives a notice that the WQE has been added to the RDMA send queue, and reads the WQE. I/O manager 536A then reads the data from the specified location in memory 514A and writes the data to the specified location in memory 516A. I/O controller 508A may include a virtual drive map 533A that maps host LBAs of high level volume 519A to one or more virtual drives (e.g., to virtual drive 521A). I/O manager may use the virtual drive map 533A to determine logical block addresses of the virtual drives, referred to as physical LBAs, that map to the host LBAs identified in the WQE. In one embodiment, each physical LBA has a size of 4 kB, and each host LBA has a size of 4 kB. However, other LBA sizes may be used, and the host LBA sizes may not be the same as the physical LBA sizes.

The volume 519A is mapped to a set of low level virtual drives or meta-drives, where each low level virtual drive may correspond to a particular SSD (or a portion of a particular SSD) that makes up a part of the volume. I/O manager 536A may select available low level virtual drives to write portions of the data to. In one embodiment, I/O manager 536A determines, for each host LBA to be written to, a low level virtual drive and physical LBA to store the data for that host LBA. I/O manager 536A additionally determines a virtual submission queue of the low level virtual drive to use for sending a write command to the SSD that corresponds to the low level virtual drive. The write command may be an NVMe write command in embodiments. The write command may specify the physical LBA, a memory address of the memory 516A storing the portion of data to be stored in the physical LBA, the virtual submission queue and/or the virtual drive. In an example, a portion of data may be designated for a physical LBA and storage on SSD 550. Accordingly, a write command may be written to a virtual submission queue 520A that corresponds to a submission queue in submission queue subset 525A.

The SSD to which the portion of data will be written is in a management controller's domain, which is a different domain than the domain of the I/O controller 508A. I/O controller 508A includes translation map 531A that enables I/O manager 536A to translate between memory addresses of the management controller's domain and memory addresses of the I/O controller's domain. To enable the SSD to properly determine the location of the portion of data in the memory 516A, I/O manager 536A may translate the memory address of the portion of the data in memory 516A to a corresponding different memory address in the management controller's domain. The body of the write command that is written to the virtual submission queue may include the translated memory address of the management controller's memory.

I/O manager 536A may send a notice to the SSD that the write command has been added to the virtual submission queue. The notice may be directed to a memory address of the I/O controller 508A that has been allocated to the virtual drive that is associated with the SSD. Translator 524A may be interposed between I/O controller 508A and a switch that connects to the SSD. Translator 524A may include a copy of translation map 531A. Translator 524A may use the translation map 531A to translate in a header of the notice the memory address of memory 516A that has been allocated to the virtual drive (e.g., virtual drive 519A) to the memory address of the management controller's memory that has been allocated to the corresponding SSD (e.g., SSD 550). The notice may then be sent to the SSD (e.g., SSD 550) by the switch (not shown).

The SSD (e.g., SSD 550) sends to the I/O Controller 508A a request for the command that is in the I/O controller 508A (e.g., reads the command that is in the I/O controller 508A). In this example the command is a write command. The request includes a memory address of the management controller that is allocated to the submission queue (e.g., a submission queue of submission queue subset 525A) that corresponds to the virtual submission queue (e.g., one of virtual submission queues 520A) in which the write command was written. The translator 524A receives the request for the command and uses the translation map 531A to translate the memory address of the management controller that has been allocated to the submission queue to the memory address of the I/O controller 508A that has been allocated to the associated virtual submission queue. The contents of the command (e.g., the write command) are then provided to the SSD (e.g., to SSD 550).

As noted, the contents of the write command were written by I/O manager 536A using a memory address of the management controller that was allocated to the port of the I/O controller 508A. Accordingly, the SSD uses the contents of the write command to issue a read request to that memory address of the management controller. Translator 524A uses translation map 531A to translate the memory address of the management controller to a corresponding different memory address of the I/O controller 508A at which the portion of data is stored in memory 516A. The SSD (e.g., SSD 550) then writes the portion of data to its persistent storage. Once the data is written, the SSD writes an acknowledgement to a completion queue (e.g., a completion queue of completion queue subset 527A) that has been allocated to the I/O controller 508A. The I/O controller 508A receives the acknowledgement via the completion queue.

As mentioned, the data may have a size that is greater than a single physical LBA. In such a case, the data is divided into data portions that are the size of a physical LBA. Each data portion may be written to a different physical LBA on an SSD. For example, a first data portion may be written to SSD 550, a second data portion may be written to a second SSD, a third data portion may be written to a third SSD, and so on. In some instances multiple different data portions may be written to a single SSD. Once acknowledgements are received that all data portions of the data have been written to SSDs, I/O manager 536A sends an acknowledgment back to host computing device 504A indicating that the data has been successfully stored at the host LBA of the volume 519A.

In one embodiment the memory address range of I/O controller 508A that is allocated to the port (e.g., a PCIe port) of I/O controller 508A is the same memory address range that host computing device 504A can write to using RDMA. Accordingly, a first RDMA operation may be used to directly write data from memory 514A to memory 516A. A second RDMA operation may then be used to directly write data from memory 516A to one or more SSDs (e.g., to write a portion of the data to SSD 550). This enables data to be stored in the SSDs with a minimum number of copies, which improves performance.

I/O manager 536A may handle read requests from host computing device 504A in a similar fashion as discussed above with regards to write requests. Host computing device may add a WQE to an RDMA receive queue that specifies host LBAs of volume 519A that are to be read from. I/O manager 536A retrieves the WQE and uses virtual drive map 533A to map the host LBAs to physical LBAs. I/O manager 508A determines the SSDs associated with the physical LBAs, and adds read commands to virtual submission queues for virtual drives associated with those SSDs. The read commands may be NVMe commands in some embodiments. For example, I/O manager 536A may add a read command to one of virtual submission queues 520A. I/O manager 536A sends notices to the SSDs, which are translated by translator 524A. For example, SSD 550 may receive a translated notice of a read command in a virtual submission queue 520A. The SSDs retrieve the read commands in a similar manner to how write commands are retrieved. The SSDs then retrieve data associated with physical LBAs identified in the read commands, and write the data to a memory address range of the management controller that has been allocated to a port of I/O controller 508A. The translator 524A translates the memory address range of the management controller to a memory address range of the I/O controller 508A that has been allocated to the port, and the data is written to that memory address range in the memory 516A of the I/O controller 508A. This data is then written from memory 516A to memory 514A using an RDMA operation.

Host computing device 504B includes a memory 514B and a volume 519B that has been presented to host computing device 504B by I/O controller 508B. I/O controller 508B includes a memory 516B, a local mapping module 54B, an I/O manager 536B, a set of low level virtual drives or meta-drives that include virtual drive 519B, a translation map 531B, a memory map 530B, a virtual drive map 533B and configuration data 532B. Virtual drive 519B includes a set of virtual submission queues 520B that map to a submission queue subset 525B of SSD 550 and a set of virtual completion queues 522B that map to a completion queue subset 527B of SSD 550. A translator 524B translates between a domain of the I/O controller 508B and a domain of a management controller (e.g., for messages between I/O controller 508B and SSD 550). I/O controller 508B handles read and write requests from host computing device 504B in the same manner that I/O controller 508A handles read and write requests from host computing device 504A.

Notably, I/O controller 508A and I/O controller 508B are able to share access to SSD 550 by using different queue pair subsets that have been allocated to the respective I/O controllers 508A-B by the management controller. For example, I/O controller 508A may issue read and write commands to SSD 550 using queue pair subset 575A and in parallel or simultaneously I/O controller 508B may issue read and write commands to SSD 550 using queue pair subset 575B. Additionally, SSD 550 may have simultaneous or parallel access to a memory address range of I/O controller 508A (e.g., a 128 MB memory address range of I/O controller 508A) and a memory address range of I/O controller 508B (e.g., a 128 MB address range of I/O controller 508B). Each SSD can access the full available memory address range that has been allocated to a port of each I/O controller. Accordingly, each I/O controller of the storage server may have parallel access to any number of SSDs, and at the same time each SSD may have parallel access to any number of I/O controllers. In other words, the I/O controllers and SSDs may be connected in a mesh configuration.

Figure 6:
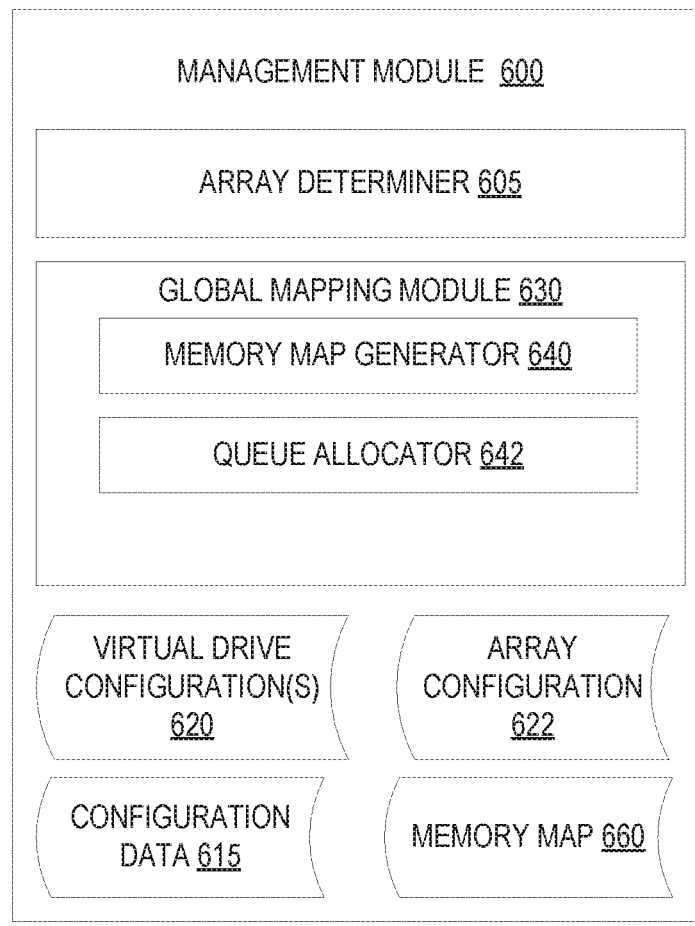
FIG. 6 is a block diagram of a management controller, in accordance with embodiments of the present invention.

FIG. 6 is a block diagram of one embodiment of a management controller 600 showing logical modules that may be loaded into and executed by a processing device of management controller 600. Alternatively, or additionally, management controller 600 may include one or more physical modules (e.g., an integrated circuit (IC) designed with described modules or a configurable logic such as a field programmable gate array (FPGA) configured to have the modules). In one embodiment, management controller 600 includes the modules of an array determiner 605 and a global mapping module 630. Alternatively, the functionality of the array determiner 605 and/or global mapping module 630 may be divided into additional modules or may be combined into a single module. In one embodiment, management controller 600 corresponds to any of management controllers 215, 315, 415A, and/or 415B.

Array determiner 605 determines how SSDs are to be configured into an array, and may store such information as array configuration 622. Array determiner 605 additionally determines how to divide the array of storage devices into virtual drives, and this information may be included in virtual drive configuration(s) 620. Array determiner 605 may determine high level virtual drives and/or how many low level virtual drives to create, the sizes of those volumes and/or virtual drives, and what physical addresses of the SSDs to allocate to each volume and/or virtual drive. Once the configurations for the volumes and virtual drives are determined, array determiner 605 sends the virtual drive configurations 620 to I/O controllers. The I/O controllers may then use the received virtual drive configurations 620 to establish and maintain the volumes and virtual drives.

Global mapping module 630 may include a root complex for a storage server. Global mapping module 630 may determine the devices on the storage server and allocate a memory address range of a memory of the management module 600 to each of the devices. A memory map generator 640 of global mapping module 630 may generate a memory map 660, and may record memory address range assignments to the various devices in the memory map 660. An example memory map that global mapping module 630 could generate is shown in FIG. 3B.

Global mapping module 630 additionally determines the number of queue pairs that are available on each identified SSD. A queue allocator 642 of global mapping module 630 determines which I/O controllers will have access to each of the SSDs. For each SSD, queue allocator 642 then divides the number of queue pairs of that SSD between the I/O controllers that will share access to that SSD. In one embodiment, the number of queue pairs of an SSD are divided evenly between the I/O controllers that will have access to that SSD. Queue allocator 642 then allocates subsets of the queue pairs for the SSD to the I/O controllers per the determined divisions.

Once the memory map 660, array configuration 622, virtual drive configurations 620, and/or other information is determined, management module 600 may bundle this information into configuration data 615. Separate configuration data 615 may be generated for each I/O controller based on the volumes/virtual drives to be managed by that I/O controller, the queues allocated to that I/O controller, the SSDs allocated to that I/O controller, and so on. The appropriate configuration data 615 may be sent to each of the I/O controllers over a sideband communication.

Figure 7:
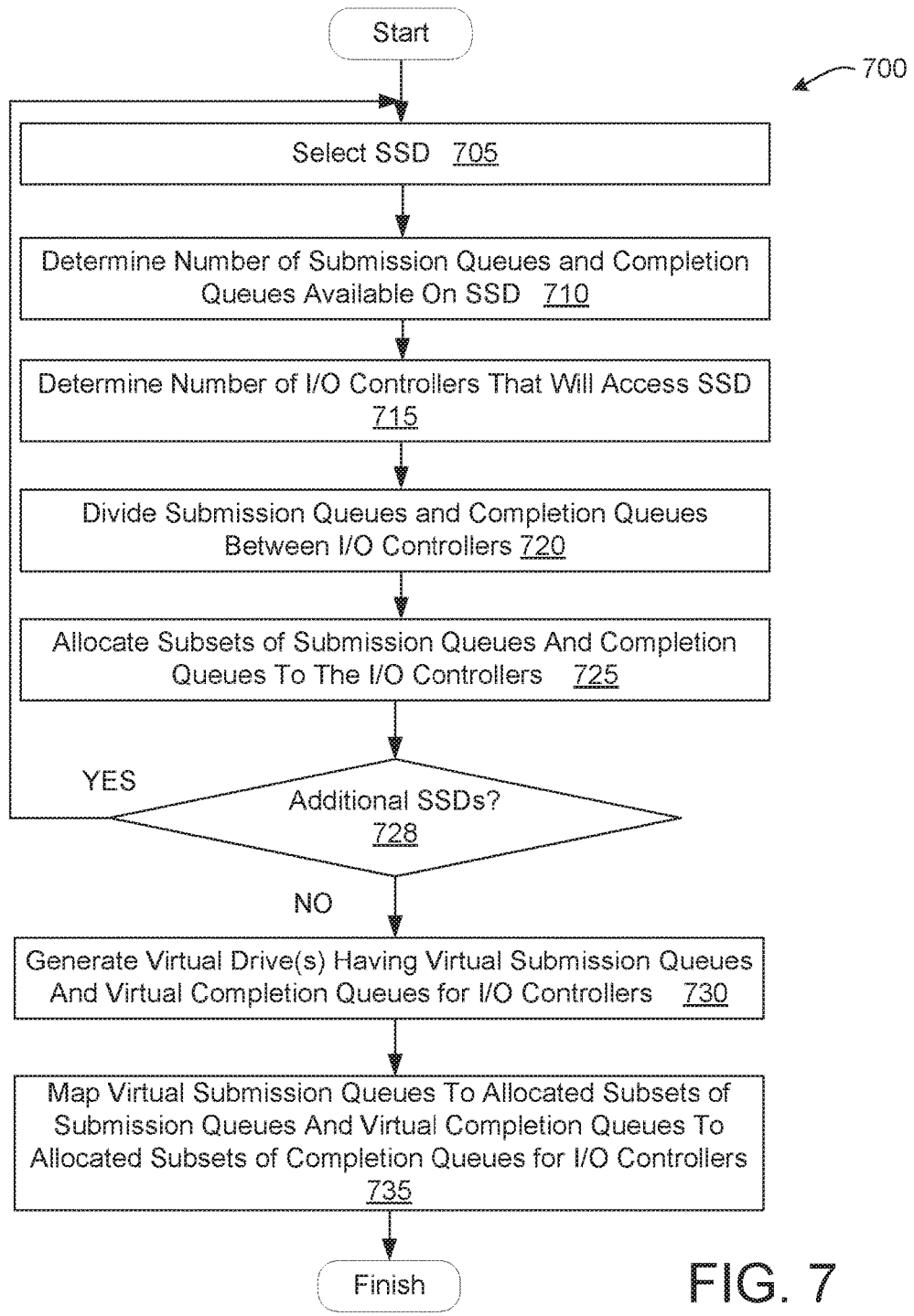
FIG. 7 is a flow diagram of one embodiment for a method of setting up data paths between SSDs and I/O controllers.
Figure 8:
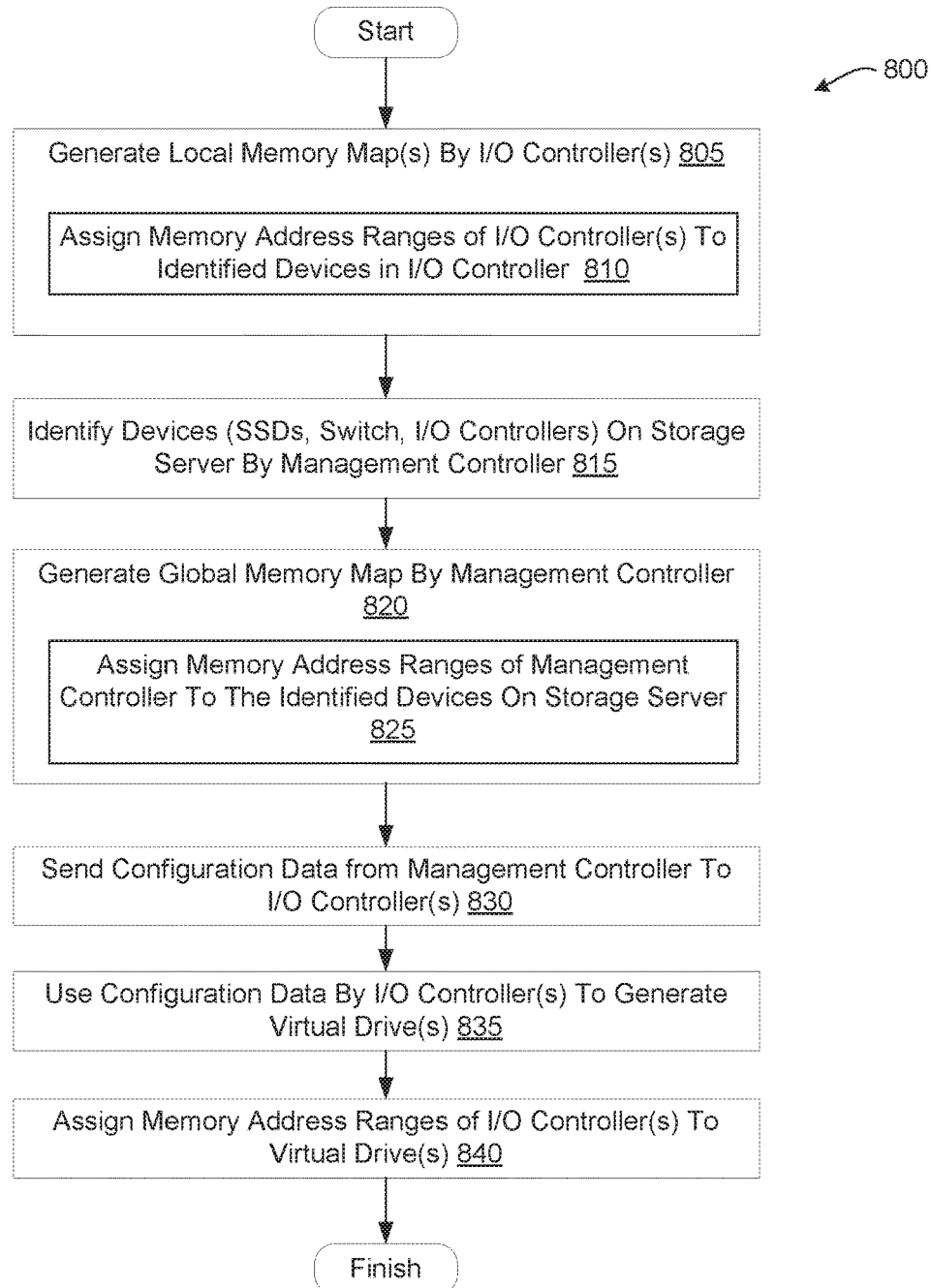
FIG. 8 is a flow diagram of one embodiment for a further method of setting up data paths between SSDs and I/O controllers.
Figure 9:
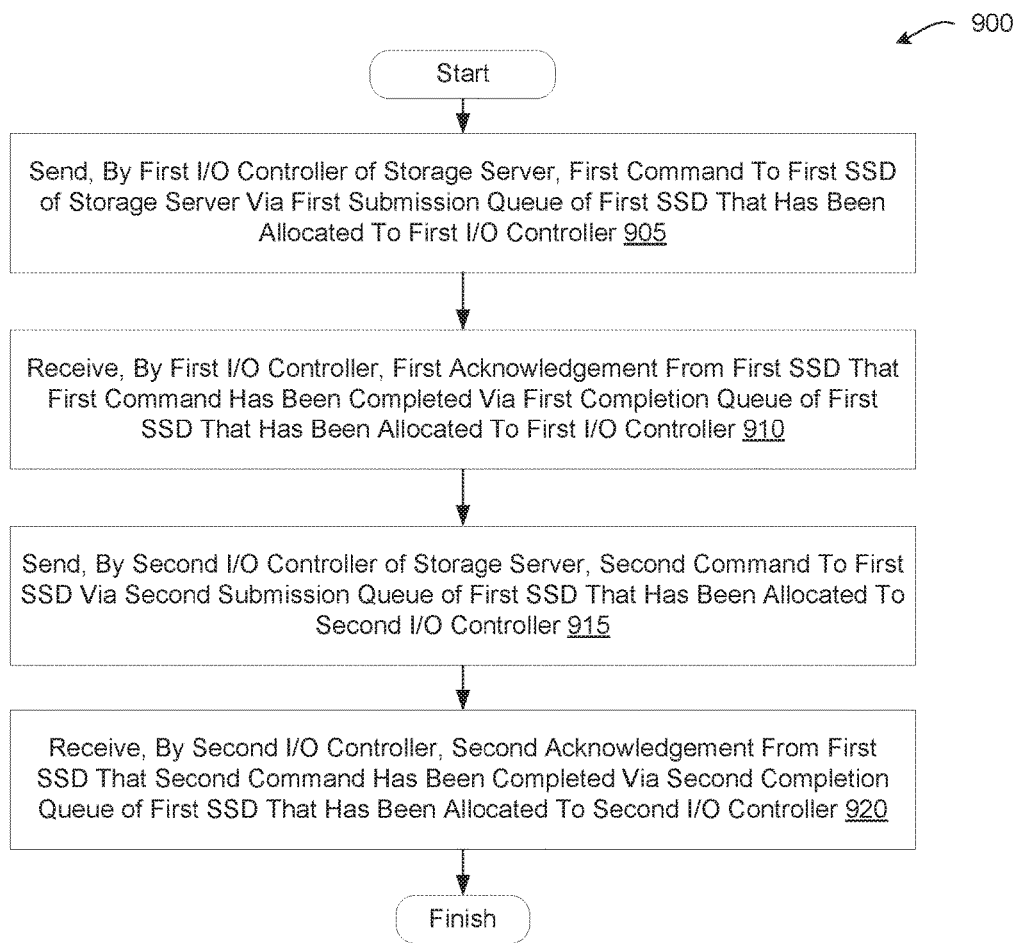
FIG. 9 is a flow diagram of one embodiment for a method of accessing an SSD by multiple I/O controllers in parallel.

FIGS. 7-8 are flow diagrams of various implementations of methods related to setting up a logical architecture for a storage server. FIGS. 9-11 are flow diagrams of various implementations of methods related to reading data from and writing data to SSDs on a storage server using the logical architecture that has been established for the storage server. The methods are performed by processing logic that may include hardware (circuitry, dedicated logic, etc.), software (such as is run on a general purpose computer system or a dedicated machine), or a combination of both. Some methods and/or operations of methods may be performed by a management controller, such as management controllers 215, 315, 415A, 415B, and 600. Some methods and/or operations of methods may be performed by an I/O controller such as any I/O controllers 208A-Y, 308A-Y, 408A-Y, and 508A-B.

For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events.

FIG. 7 is a flow diagram of one embodiment for a method 700 of setting up data paths between SSDs and I/O controllers. At block 705 of method 700, processing logic selects an SSD. At block 710, processing logic determines a number of submission queues and completion queues available on the SSD. In one embodiment, the SSD is an NVMe SSD and the submission queues and completion queues are arranged as NVMe queue pairs.

At block 715, processing logic determines a number of I/O controllers that will access the SSD. At block 720, processing logic divides the submission queues and completion queues between the determined number of I/O controllers. In one embodiment, the submission queues and completion queues are evenly divided (or approximately evenly divided) between the I/O controllers. Alternatively, the submission queues and completion queues may be divided unevenly (e.g., based on service level agreement policies enacted by an administrator).

At block 725, processing logic allocates subsets of the submission queues and completion queues to the I/O controllers based on the determined divisions. For example, a first I/O controller may be allocated submission queues 1-20, a second I/O controller may be allocated submission queues 21-40, a third I/O controller may be allocated submission queues 41-60 and so on. Processing logic may also allocate a memory address range of a management controller's memory to each of the submission queues and completion queues.

At block 728, processing logic determines whether there are any additional SSDs for which submission queue subsets and completion queues subsets have not been allocated to I/O controllers. If so, the method returns to block 705 and another SSD is selected. Otherwise the method proceeds to block 730.

In one embodiment, the operations of blocks 705-728 are performed by a management controller. In one embodiment, once the management controller has allocated submission queue subsets and completion queue subsets of all of the SSDs, the management controller sends configuration data to one or more of the I/O controllers indicating the submission queue subsets and completion queue subsets of the SSDs that are allocated to those I/O controllers as well as the memory address ranges of the management controller's memory that have been allocated to the submission queue subsets and completion queue subsets. Additionally, the management controller may inform the SSDs about the I/O controllers that are mapped to the SSDs. This may enable the SSDs to know the addresses of each queue pair that is assigned to an I/O controller. In one embodiment, the addresses of the queues will reside on the different I/O controllers and thus the act of management writing the addresses implicitly describes the SSD to I/O controller connections.

At block 730, processing logic generates one or more low level virtual drives (e.g., meta-drives) that include virtual submission queues and virtual completion queues (e.g., virtual queue pairs) for the I/O controllers. An I/O controller may generate a separate low level virtual drive for each SSD allocated to that I/O controller in one embodiment. In another embodiment, the I/O controller may create a virtual drive and/or volume that aggregates multiple physical SSDs.

The I/O controller may additionally allocate memory address ranges of a memory of the I/O controller to the virtual submission queues and to the virtual completion queues. The allocated memory address ranges may be portions of a larger memory address range of the I/O controller's memory that have been allocated to a port of the I/O controller. At block 735, processing logic maps the virtual submission queues to allocated subsets of submission queues for the I/O controllers. Similarly, processing logic maps the virtual completion queues to allocated subsets of completion queues for the I/O controllers. This may include recording a mapping between the memory address ranges of the I/O controller's memory for the virtual submission queues and the memory address ranges of the management controller's memory for the submission queue subsets that are associated with the virtual submission queues, for example. The operations of blocks 730 and 735 may be performed separately by each I/O controller in a storage server in embodiments.

FIG. 8 is a flow diagram of one embodiment for a further method 800 of setting up data paths between SSDs and I/O controllers. At block 805 of method 800 the I/O controllers in a storage server independently generate local memory maps. Generating a local memory map by an I/O controller may include determining a number of ports included in the I/O controller and assigning memory address ranges of the I/O controller's memory to each of the ports, as indicated in block 810.

At block 815, a management controller of the storage server identifies devices on the storage server. This may include performing the above described discovery operations to identify all of the SSDs, switches, I/O controllers and/or other devices on the storage server. At block 820, the management controller generates a global memory map. This may include assigning memory address ranges of the management controller's memory to each of the identified devices, as indicated in block 825.

At block 830, the management controller 830 sends configuration data to the I/O controllers. The configuration data that is sent to an I/O controller may include the memory address ranges of the management controller that have been assigned to one or more of the SSDs, the management controller, the switch, the other I/O controllers, and so forth.

At block 835, the I/O controllers separately use the configuration data that they received to generate virtual drives. An I/O controller may generate a virtual drive for each SSD that it has access to. The virtual drives may each include a set of virtual submission queues and a set of virtual completion queues that maps to submission queue subsets of SSDs and completion queue subsets of SSDs. At block 840, the I/O controllers assign memory address ranges of the I/O controllers to the virtual drives. This may include assigning memory address ranges to each of the virtual submission queues and virtual completion queues in the virtual drives. The memory address ranges assigned to the virtual drives in an I/O controller may be subsets of the memory address range assigned to a port in the I/O controller.

One or more of the operations of method 800 and one or more of the operations of method 700 may be performed in conjunction in embodiments. For example, the operations of blocks 705-728 of method 700 may be performed between blocks 815 and 820 of method 800 in embodiments. Additionally, the operations of block 730 of method 700 may be performed at block 835 of method 800. Additionally, the operations of block 735 of method 700 may be performed after block 840 of method 800.

FIG. 9 is a flow diagram of one embodiment for a method 900 of accessing an SSD by multiple I/O controllers in parallel. At block 905 of method 900, a first I/O controller of a storage server sends a first command to a first SSD of the storage server via a first submission queue of the first SSD that has been allocated to the first I/O controller. The first I/O controller may also send one or more additional commands to other SSDs via submission queues of those SSDs that have been allocated to the first I/O controller.

At block 910, the first I/O controller receives a first acknowledgement from the first SSD that the first command has been completed. The first acknowledgement is received via a first completion queue of the first SSD that has been allocated to the first I/O controller. The first completion queue and the first submission queue may be part of a first queue pair of the SSD. The first I/O controller may also receive additional acknowledgements that other commands have been completed via completion queues of other SSDs that have been allocated to the first I/O controller.

At block 915, a second I/O controller of the storage server sends a second command to the first SSD via a second submission queue of the first SSD that has been allocated to the second I/O controller. The second I/O controller may also send one or more additional commands to other SSDs via submission queues of those SSDs that have been allocated to the second I/O controller.

At block 920, the second I/O controller receives a second acknowledgement from the first SSD that the second command has been completed. The second acknowledgement is received via a second completion queue of the first SSD that has been allocated to the second I/O controller. The second completion queue and the second submission queue may be part of a second queue pair of the SSD. The second I/O controller may also receive additional acknowledgements that other commands have been completed via completion queues of other SSDs that have been allocated to the second I/O controller.

Advantageously, the first I/O controller and the second I/O controller may access the first SSD concurrently using the respective queue pairs that have been allocated to the first and second I/O controllers.

Figure 10A:
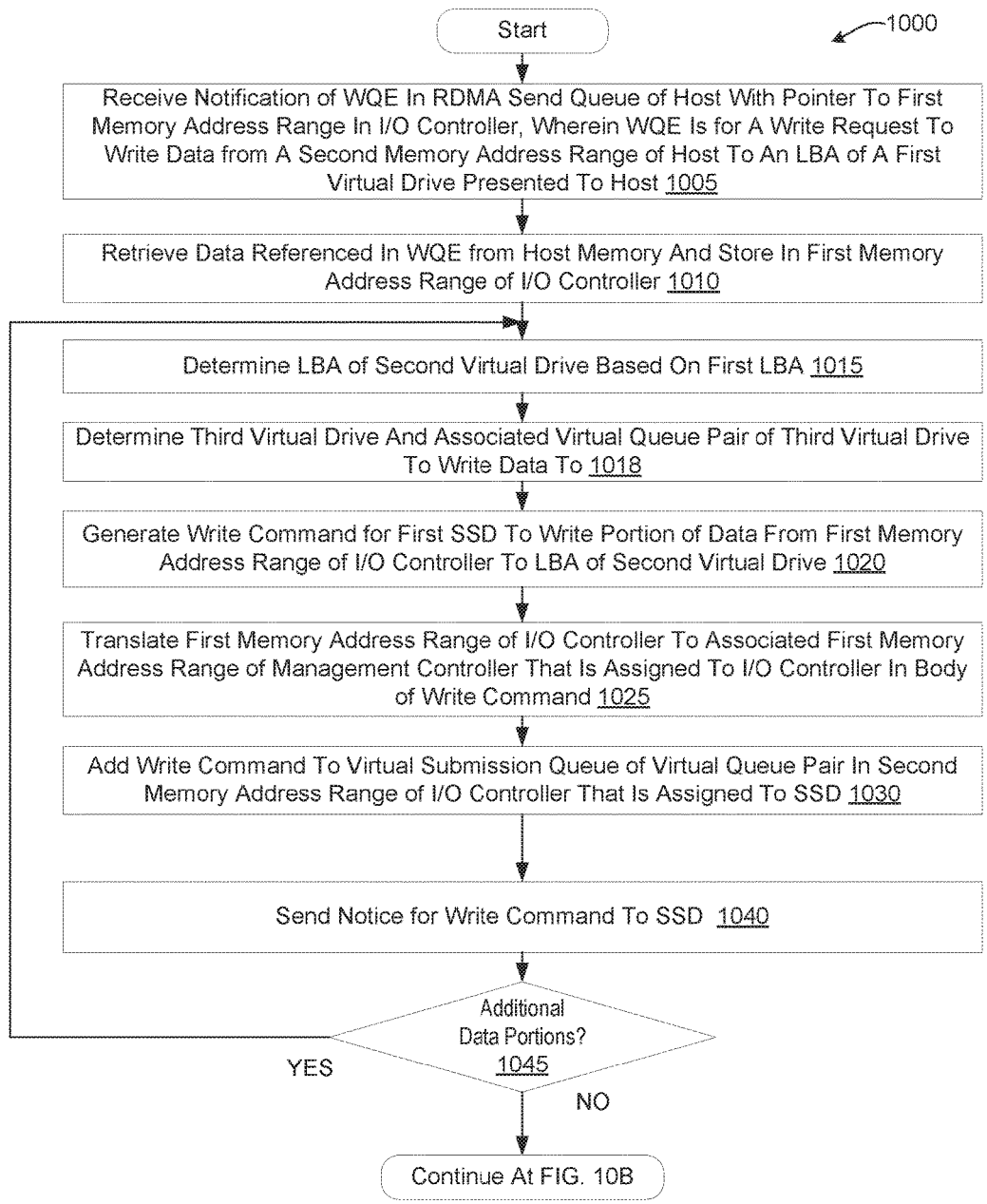
FIGS. 10A-10B show a flow diagram of one embodiment for a method of writing data to multiple SSDs by an I/O controller.
Figure 10B:
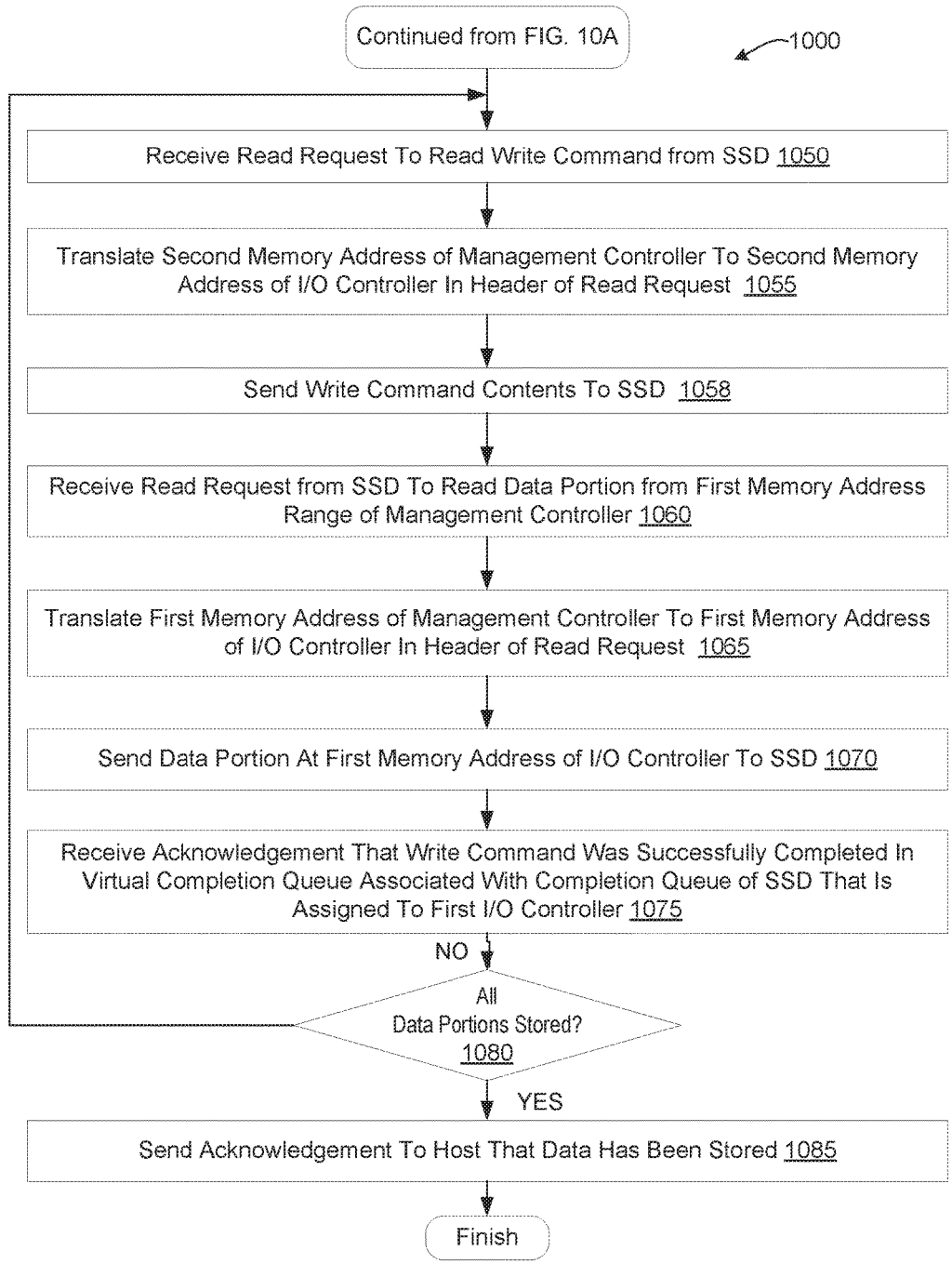
Figure 11:
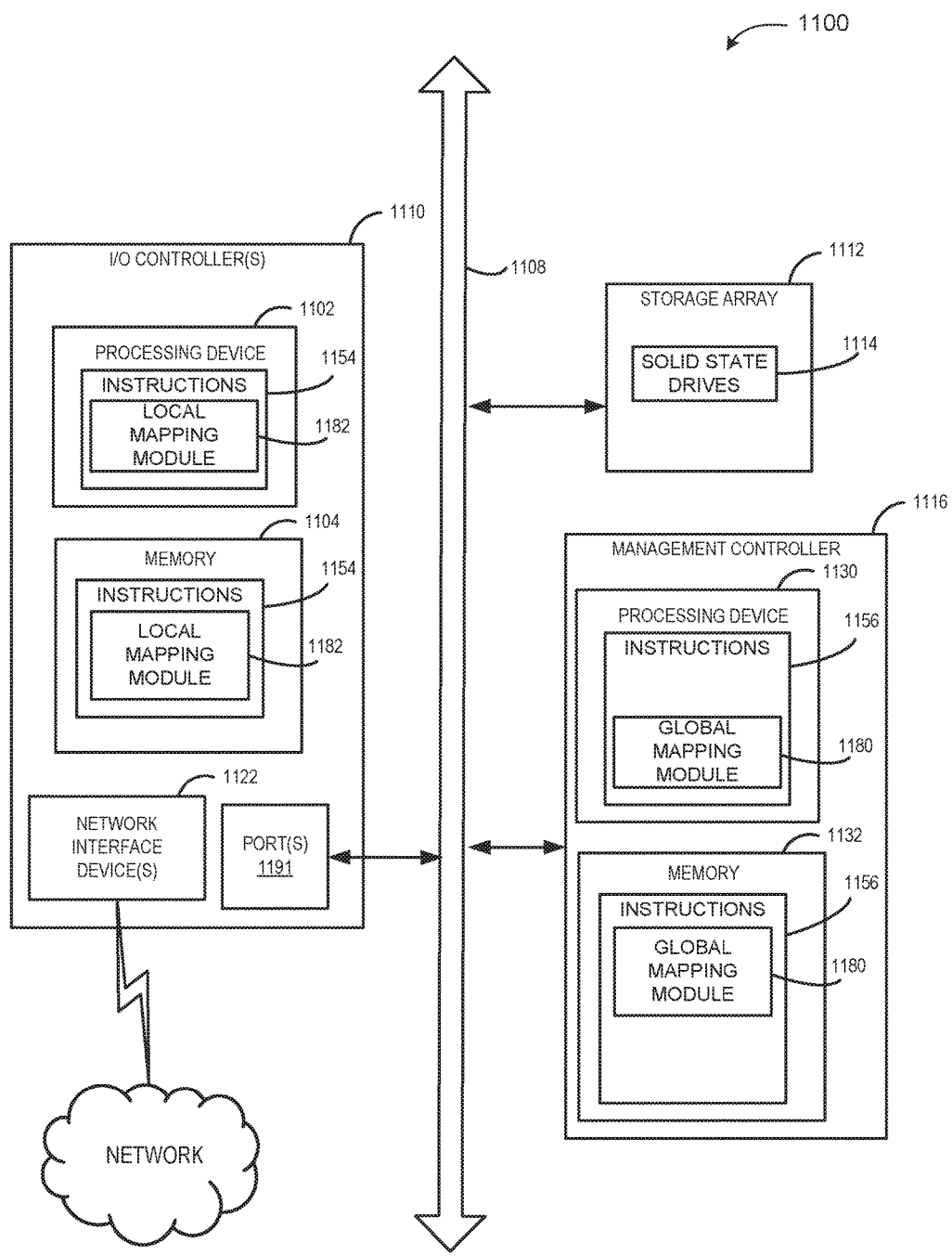
FIG. 11 illustrates an example computing device, in accordance with one embodiment.

FIGS. 10A-10B together provide a flow diagram of one embodiment for a method 1000 of writing data to multiple SSDs by an I/O controller. At block 1005 of method 1000 processing logic for an I/O controller receives a notification of a WQE in an RDMA send queue of a host. The WQE includes a write command to write data to a first (host) LBA of a first virtual drive (volume) that is presented to the host, and indicates that the data is to be written directly from a memory of the host to a memory of the first I/O controller. The WQE includes a pointer to a first memory address range in the I/O controller to which data is to be written and a pointer to a second memory address range in the host at which the data is located.

At block 1010, the I/O controller retrieves data referenced in the WQE from the host memory and stores the data in the first memory address range of the I/O controller's memory. At block 1015, the I/O controller determines a second (physical) LBA of a second virtual drive based on the first (host) LBA. At block 1018, the I/O controller additionally determines a virtual queue pair of the second virtual drive to be used to send commands to an SSD associated with the second virtual drive. In some embodiments, an intermediate virtual drive is interposed between the first virtual drive (volume) and second virtual drive(s) for an additional layer of abstraction.

At block 1020, the I/O controller generates a write command for the first SSD to write a portion of the data from the first memory address range of the I/O controller to the physical LBA of the second virtual drive. At block 1025, processing logic translates the first memory address range of the I/O controller to an associated first memory address range of a management controller that is assigned to the I/O controller in a body of the write command. There may be a one to one mapping of an address range of the I/O controller that is allocated to a port of the I/O controller used to transmit data to SSDs and an address range of the management controller that is allocated to the port of the I/O controller. At block 1030, the I/O controller adds the write command to the virtual submission queue in a second memory address range of the I/O controller that is assigned to the virtual submission queue. At block 1040, the I/O controller sends a notice for the write command to the SSD. The notice may be translated by a translator on its way to the SSD. The SSD may then issue a read request to read the write command from the virtual submission queue. The read request may be translated by the translator on its way to the I/O controller. The SSD may then issue a request to read the data portion from the first memory address range of the management controller. The read request may be translated by the translator to a request to read the data portion from the first memory address range of the I/O controller.

At block 1045, the I/O controller determines if write commands have been issued for all data portions of the data. If there are additional data portions for which write commands to SSDs have not yet been issued, the method returns to block 1015 to process an additional data portion. Otherwise the method proceeds to block 1050. The method may also branch and continue to block 1050 for some data portions and return to block 1015 for other data portions.

Continuing at block 1050, a translator receives a read request from an SSD to read a write command from a submission queue of the SSD. The read request may specify a second memory address of a management controller allocated to the submission queue of the SSD. At block 1055, the translator translates the read request to read the write command from a virtual submission queue of the second virtual drive that is associated with the submission queue of the SSD. This may include translating the second memory address of the management controller to an associated second memory address of the I/O controller allocated to the virtual submission queue. At block 1058 the I/O controller receives the read request and sends the contents of the write command to the SSD.

At block 1060, the translator receives a request to read a data portion from the first memory address range of the management controller as specified in the write command. At block 1065, the translator translates the first memory address of the management controller to the first memory address of the I/O controller. At block 1070 the I/O controller receives the read request and sends the data portion at the first memory address of the I/O controller to the SSD.

At block 1075, the I/O controller receives an acknowledgement that the write command was successfully completed. The acknowledgement may be received at a virtual completion queue of the second virtual drive that is associated with a completion queue of the SSD. At block 1080, the I/O controller determines whether all data portions have been stored. If not all data portions have been stored, the method returns to block 1050 for another data portion. If acknowledgements have been received for all data portions (and thus all data portions have been stored), the method continues to block 1085. At block 1085, the I/O controller sends an acknowledgement to the host.

FIG. 11 illustrates a diagrammatic representation of a machine in the example form of a computing device 1100 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a hardware storage server, and may provide storage to hosts using one or more of a storage area network (SAN) or network attached storage (NAS) methodology. Further, while only a single machine is illustrated, the term "machine" shall also be taken to include any collection of machines (e.g., computers) that individually or jointly execute a set (or multiple sets) of instructions to perform any one or more of the methodologies discussed herein. The computing device 1100 may correspond to any of storage servers 205, 300, 401, and 500.

The example computing device 1100 includes one or more I/O controllers 1110, a storage array 1112, and a management controller 1116 (or multiple management controllers 1116), which communicate with each other via an interconnection network 1108. Interconnection network 1108 may include one or more switches (e.g., switch 210 of FIG. 2) and one or more storage fabrics (also referred to as backplane fabrics). Each storage fabric includes hardware (e.g., switches, etc.) that connects I/O controllers 1110 to SSDs 1114. Each storage fabric may include a fabric board (e.g., a printed circuit board (PCB) that includes multiple hardware components. Alternately, multiple storage fabrics may be part of a single backplane printed circuit board (PCB). Each storage fabric enables any I/O controller 1110 to connect to any SSD 1114. Each storage fabric may be independent of other storage fabrics, using its own hardware, ports, connections, etc. that are distinct from those used by the other storage fabrics. Accordingly, if any component in a storage fabric fails and causes that storage fabric to fail, the I/O controllers 1110 may continue to maintain connections to the SSDs 1114 via an alternative storage fabric.

Each I/O controller 1110 represents a device configured to connect one or more host computing devices to one or more SSDs (e.g., I/O controller 208A-Y of FIG. 2). An I/O controller 1110 includes a processing device 1102, and a memory 1104 (e.g., read-only memory (ROM), flash memory, dynamic random access memory (DRAM) such as synchronous DRAM (SDRAM) or Rambus DRAM (RDRAM), etc.). The I/O controller 1110 may further include one or more network interface devices 1122 to connect to a network. The I/O controller 1110 may additionally include one or more ports (e.g., PCI or PCIe ports) to connect the I/O controller 1110 to interconnection network 1108. In one embodiment, each I/O controller 1110 is a system on a chip (SoC) including processing device 1102, memory 1104, one or more ports 1191, and one or more network interface devices 1122.

Management controller 1116 represents a device configured to manage a storage fabric. Management controller 1116 may include a memory 1132 having instructions 1156 and a processing device 1130 that loads and executes those instructions 1156. Memory 1132 may be read-only memory (ROM), flash memory, dynamic random access memory (DRAM) such as synchronous DRAM (SDRAM) or Rambus DRAM (RDRAM), etc. In one embodiment, management controller 1116 is a system on a chip (SoC) including processing device 1130 and memory 1132.

Processing device 1102 and/or processing device 1130 represents one or more general-purpose processors such as a microprocessor, central processing unit, or the like. More particularly, the processing device 1102 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 1102 may also be one or more special-purpose processing devices such as an application specific integrated circuit (ASIC), a field programmable gate array (FPGA), a digital signal processor (DSP), network processor, or the like. Processing device 1102 is configured to execute processing logic (e.g., instructions 1154) for performing operations discussed herein.

The memory 1104 may be a machine-readable storage medium (or more specifically a computer-readable storage medium) on which is stored one or more sets of instructions 1154 embodying any one or more of the methodologies or functions described herein. The instructions 1154 may also reside, completely or at least partially, within the processing device 1102 during execution thereof by the I/O controller 1110, the processing device 1102 also constituting computer-readable storage media. Alternatively, or additionally, the instructions 1154 may be resident on a solid state storage drive (e.g., a solid state storage drive 1114) and/or a hard disk drive connected to interconnection network 1108.

The instructions may include a local mapping module 1182 (e.g., as described above with respect to FIGS. 2-5), and/or a software library containing methods that call a local mapping module 1182. In some embodiments the local mapping module interfaces with or includes a root complex of the I/O controller 1110. While the computer-readable storage medium is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any non-transitory medium that is capable of storing or encoding a set of instructions for execution by the machine and that cause the machine to perform any one or more of the methodologies described herein. The term "computer-readable storage medium" shall accordingly be taken to include, but not be limited to, solid-state memories, and optical and magnetic media.

The storage array 1112 represents a device that contains a group of solid state drives (SSDs) 1114. Storage array 1112 may arrange SSDs 1114 into logical redundant storage containers, or a redundant array of independent disks (RAID). The storage array 1112 may distribute data across the SSDs 1114 in one of several RAID levels to provide different levels of redundancy and performance. In some implementations, storage array 1112 may include one group of SSDs 1114 for data and another group of SSDs 1114 for recovery purposes. SSDs 1114 may be SAS/SATA drives, non-volatile memory express (NVMe) drives, small computer system interface (SCSI) over PCIe (SOP) drives, or solid state drives that communicate using different protocols. The number of SSDs 1114 included in storage array 1112 may be less than 10 to more than 100. The SSDs 1114 may have the same or different storage capacities.

The management controller 1116 may be a device configured to perform particular operations with regards to management of the array of SSDs 1114 in storage array 1112. Management controller 1116 may include a volatile and/or non-volatile memory 1132 to store one or more sets of instructions 1154 embodying any one or more of the methodologies or functions described herein. The instructions 1156 may include a global mapping module 1180 (e.g., as described above with respect to FIGS. 2-6), and/or a software library containing methods that call a global mapping module 1180. In some embodiments the global mapping module interfaces with or includes a root complex of the management controller 1116.

The modules, components and other features described herein can be implemented as discrete hardware components or integrated in the functionality of hardware components such as ASICS, FPGAs, DSPs, SoCs or similar devices. In addition, the modules can be implemented as firmware or functional circuitry within hardware devices. Further, the modules can be implemented in any combination of hardware devices and software components, or only in software.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving", "allocating", "sending", "generating", "writing", "determining", "retrieving", or the like, refer to the actions and processes of a processing device or processing logic that manipulates and transforms data represented as physical (e.g., electronic) quantities within registers and memories into other data similarly represented as physical quantities within the memories or registers or other such information storage devices.

Embodiments of the invention also relate to an apparatus for performing the operations herein. This apparatus may be specially constructed for the required purposes, or it may comprise a general purpose computer selectively activated or reconfigured by a computer program or firmware stored in the computer. Such a computer program or firmware may be stored in a computer readable storage medium, such as, but not limited to, any type of disk including optical disks, CD-ROMs, and magnetic-optical disks, read-only memories (ROMs), random access memories (RAMs), electrically programmable read only memories (EPROMs), electrically erasable programmable read only memories (EEPROMs), magnetic or optical cards, or any type of media suitable for storing electronic instructions. The term "computer-readable storage medium" shall also be taken to include any medium other than a carrier wave that is capable of storing or encoding a set of instructions for execution by the computing device that cause the computing device to perform any one or more of the methodologies of the present invention.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
    allocating, by a management controller included in a storage server, a first queue pair of a first solid state drive (SSD) of the storage server to a first input/output (I/O) controller in the storage server, the first queue pair comprising a first submission queue and a first completion queue;
    allocating, by the management controller, a second queue pair of the first SSD to a second I/O controller in the storage server, the second queue pair comprising a second submission queue and a second completion queue;
    sending, by the first I/O controller, a first command to the first SSD via the first submission queue of the first SSD that has been allocated to the first I/O controller, wherein the first command is a first read command or a first write command;
    receiving, by the first I/O controller, a first acknowledgement from the first SSD that the first command has been completed via the first completion queue of the first SSD that has been allocated to the first I/O controller;
    sending, by the second I/O controller, a second command to the first SSD of the storage server via the second submission queue of the first SSD that has been allocated to the second I/O controller, wherein the second command is a second read command or a second write command, and wherein the second I/O controller sends the second command to the first SSD in parallel to the first I/O controller sending the first command to the first SSD; and
    receiving, by the second I/O controller, a second acknowledgement from the first SSD that the second command has been completed via the second completion queue of the first SSD that has been allocated to the second I/O controller;
    wherein the management controller comprises a root complex for the storage server but is not in a data path for the storage server, wherein the first I/O controller lacks the root complex for the storage server, and wherein the second I/O controller lacks the root complex for the storage server.

2. The method of claim 1, further comprising:
    receiving, by the first I/O controller, a host command to write data from a host to a first virtual drive presented to the host;
    reading the data from a first region of memory in the host;
    writing the data to a second region of memory in the first I/O controller; determining a first virtual submission queue, wherein the first virtual submission queue maps to the first submission queue of the first SSD; and
    writing the first command to the first virtual submission queue.

3. The method of claim 2, wherein the host command is a command to write the data from the host to a first logical block address of the first virtual drive, the method further comprising:
    determining a second logical block address of a second virtual drive based on the first logical block address of the first virtual drive, wherein the first virtual submission queue and the second virtual drive are associated with the second logical block address.

4. The method of claim 2, wherein reading the data from the first region of memory in the host and writing the data to the second region of memory in the first I/O controller comprises performing a first remote direct memory access (RDMA) operation, and wherein a second RDMA operation is performed to write the data from the second region of memory in the first I/O controller to the first SSD.

5. The method of claim 2, wherein the first command is a command to write a first portion of the data to the first SSD, the method further comprising:
    sending, by the first I/O controller, a third command to a second SSD of the storage server via a first submission queue of the second SSD that has been allocated to the first I/O controller, wherein the third command is a third write command to write a second portion of the data to the second SSD, and wherein sending the third command to the second SSD comprises:
    determining a second virtual submission queue that maps to the first submission queue of the second SSD;
    writing the third command to the second virtual submission queue; and
    receiving a third acknowledgement from the second SSD that the third command has been completed via a first completion queue of the second SSD that has been allocated to the first I/O controller.

6. The method of claim 2, further comprising:
    determining a first memory address of the first I/O controller associated with the first virtual submission queue, wherein writing the first command to the first virtual submission queue comprises writing the first command to the first memory address of the first I/O controller.

7. The method of claim 6, wherein the first SSD is in a first domain of the management controller of the storage server, wherein the first I/O controller comprises a second domain, and wherein sending the first command to the first SSD comprises:
    sending a notification to the first SSD that the first command has been added to the first virtual submission queue;
    receiving a request for the first command from the first SSD, wherein the request comprises a second memory address of the management controller that is allocated to the first submission queue of the first SSD; and
    translating, in a header of the request, the second memory address of the management controller to the first memory address of the first I/O controller that is allocated to the first virtual submission queue.

8. The method of claim 2, wherein the first SSD is in a first domain of the management controller of the storage server, and wherein the first I/O controller comprises a second domain, the method further comprising:
    translating a first memory address of the second region of memory of the first I/O controller to a second memory address of a third region of memory of the management controller that has been allocated to the first I/O controller and that is mapped to the second region of memory of the first I/O controller, wherein the first command that is written to the first virtual submission queue comprises a reference to the second memory address of the third region of memory of the management controller.

9. The method of claim 8, further comprising:
prior to receiving the first acknowledgement, performing the following comprising:
receiving a new read request from the first SSD, the new read request referencing the second memory address of the third region of memory of the management controller; and
translating, in the new read request, the second memory address of the third region of memory of the management controller to the first memory address of the second region of memory of the first I/O controller.

10. The method of claim 8, wherein:
a plurality of SSDs that comprises the first SSD are endpoints; and
a plurality of I/O controllers that comprises the first I/O controller and the second I/O controller are endpoints that are peers of the plurality of SSDs.

11. A storage server comprising:
a plurality of solid state drives (SSDs), wherein a first SSD of the plurality of SSDs comprises a first plurality of submission queues and a first plurality of completion queues;
a management controller, wherein the management controller is to:
allocate a first submission queue and a first completion queue of the first SSD to a first input/output (I/O) controller in the storage server; and
allocate a second submission queue and a second completion queue of the first SSD to a second I/O controller in the storage server;
the first I/O controller, operatively coupled to the first SSD, wherein the first I/O controller is to:
send a first command to the first SSD via the first submission queue of the first plurality of submission queues that has been allocated to the first I/O controller, wherein the first command is a first read command or a first write command; and
receive a first acknowledgement from the first SSD that the first command has been completed via the first completion queue of the first plurality of completion queues that has been allocated to the first I/O controller; and
the second I/O controller, operatively coupled to the first SSD, wherein the second I/O controller is to:
send a second command to the first SSD via the second submission queue of the first plurality of submission queues that has been allocated to the second I/O controller, wherein the second command is a second read command or a second write command, and wherein the second I/O controller sends the second command to the first SSD in parallel to the first I/O controller sending the first command to the first SSD; and
receive a second acknowledgement from the first SSD that the second command has been completed via the second completion queue of the first plurality of completion queues that has been allocated to the second I/O controller;
wherein the management controller comprises a root complex for the storage server but is not in a data path for the storage server, wherein the first I/O controller lacks the root complex for the storage server, and wherein the second I/O controller lacks the root complex for the storage server.

12. The storage server of claim 11, wherein the first I/O controller is further to:
receive a host command to write data from a host to a first virtual drive presented to the host;
read the data from a first region of memory in the host;
write the data to a second region of memory in the first I/O controller;
determine a first virtual submission queue, wherein the first virtual submission queue maps to the first submission queue of the first SSD; and
write the first command to the first virtual submission queue.

13. The storage server of claim 12, wherein the host command is a command to write the data from the host to a first logical block address of the first virtual drive, wherein the first I/O controller is further to:
determine a second logical block address of a second virtual drive based on the first logical block address of the first virtual drive, wherein the first virtual submission queue and the second virtual drive are associated with the second logical block address.

14. The storage server of claim 12, wherein reading the data from the first region of memory in the host and writing the data to the second region of memory in the first I/O controller comprises performing a first remote direct memory access (RDMA) operation, and wherein a second RDMA operation is performed to write the data from the second region of memory in the first I/O controller to the first SSD.

15. The storage server of claim 12, wherein the first command is a command to write a first portion of the data to the first SSD, and wherein the first I/O controller is further to:
send a third command to a second SSD of the plurality of SSDs via a first submission queue of the second SSD that has been allocated to the first I/O controller, wherein the third command is a third write command to write a second portion of the data to the second SSD, and wherein sending the third command to the second SSD comprises:
determining a second virtual submission queue that maps to the first submission queue of the second SSD; and
writing the third command to the second virtual submission queue; and
receive a third acknowledgement from the second SSD that the third command has been completed via a first completion queue of the second SSD that has been allocated to the first I/O controller.

16. The storage server of claim 12, wherein the first I/O controller is further to:
determine a first memory address of the first I/O controller associated with the first virtual submission queue, wherein writing the first command to the first virtual submission queue comprises writing the first command to the first memory address of the first I/O controller.

17. The storage server of claim 16, wherein to send the first command to the first SSD the first I/O controller is to send a notification to the first SSD that the first command has been added to the first virtual submission queue, wherein the first SSD is in a first domain of the management controller, and wherein the first I/O controller comprises a second domain, the storage server further comprising:
a translation chip between the first I/O controller and the first SSD, wherein the translation chip is to:
receive a request for the first command from the first SSD, wherein the request comprises a second memory address of the management controller that is allocated to the first submission queue of the first SSD;

translate, in a header of the request, the second memory address of the management controller to the first memory address of the first I/O controller that is allocated to the first virtual submission queue; and forward the request to the first I/O controller.

18. The storage server of claim 17, wherein:

the plurality of SSDs are endpoints; and a plurality of I/O controllers that comprises the first I/O controller and the second I/O controller are endpoints that are peers of the plurality of SSDs.

19. The storage server of claim 17, wherein prior to the first I/O controller receiving the first acknowledgement, the translation chip is to:

receive a new read request from the first SSD, the new read request referencing the second memory address of the management controller;

translate, in the new read request, the second memory address of the management controller to the first memory address of the first I/O controller; and forward the new read request comprising the first memory address to the first I/O controller.

20. The storage server of claim 17, wherein the first I/O controller is further to:

translate the first memory address of the first I/O controller to the second memory address of the management controller, wherein the first command that is written to the first virtual submission queue comprises a reference to the second memory address.

* * * * *